(12) United States Patent
Itsuki

(10) Patent No.: US 7,653,410 B2
(45) Date of Patent: Jan. 26, 2010

(54) RADIO COMMUNICATION DEVICE, RADIO COMMUNICATION SYSTEM AND MEASUREMENT METHOD CAPABLE OF CONDUCTING APPROPRIATE TRANSMIT POWER CONTROL

(75) Inventor: Makoto Itsuki, Tenri (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 623 days.

(21) Appl. No.: 11/294,501

(22) Filed: Dec. 6, 2005

(65) Prior Publication Data
US 2006/0121928 A1    Jun. 8, 2006

(30) Foreign Application Priority Data
Dec. 8, 2004   (JP) ............................. 2004-355330
Oct. 24, 2005  (JP) ............................. 2005-308587

(51) Int. Cl.
*H04M 1/00* (2006.01)
(52) U.S. Cl. ................. 455/550.1; 455/63.1; 455/67.13
(58) Field of Classification Search ................. 455/41.2, 455/518–519, 69, 522, 550.1, 63.1, 67.13; 370/318, 328, 338, 431, 449, 329
See application file for complete search history.

(56) References Cited

U.S. PATENT DOCUMENTS
6,791,996 B1  9/2004  Watanabe et al.

2006/0050742 A1 *  3/2006  Grandhi et al. ............. 370/506

FOREIGN PATENT DOCUMENTS

| | | |
|---|---|---|
| EP | 1 063 785 A1 | 12/2000 |
| JP | 2001-44932 A | 2/2001 |
| JP | 2001-160813 A | 6/2001 |
| JP | 2002-51050 A | 2/2002 |
| JP | 2002-271263 A | 9/2002 |
| JP | 2005-538574 A | 12/2005 |
| JP | 2006-513593 A | 4/2006 |
| WO | WO-03/030459 A2 | 4/2003 |
| WO | WO-2004/012493 A2 | 2/2004 |

OTHER PUBLICATIONS

LAN/MAN Standards Committee—IEEE Computer Society, Part 11: Wireless LAN Medium Access Control (MAC) and Physical Layer (PHY) specifications: Amendment 5: Spectrum and Transmit Power Management Extensions in the 5 GHz band in Europe, IEEE Standard for Information technology, Oct. 14, 2003, I-xiv;1-59, IEEE Std 802.11h, The Institute of Electrical and Electronics Engineers, Inc. <URL: http://standards.ieee.org/reading/ieee/std/lanman/restricted/802.11h-2003.pdf>, New York, NY, USA.

(Continued)

*Primary Examiner*—Raymond S Dean
(74) *Attorney, Agent, or Firm*—Birch, Stewart, Kolasch & Birch, LLP

(57) ABSTRACT

When a radio communication device receives a communication permission signal assigning a communication right permitting transmission of signals, if a received signal analysis portion determines that the received signal is the communication permission signal assigning the communication right to another radio communication device, it measures communication quality with the other radio communication device within a prescribed period.

15 Claims, 33 Drawing Sheets

OTHER PUBLICATIONS

LAN/MAN Committee of the IEEE Computer Society, Part 11: Wireless LAN Medium Access Control (MAC) and Physical Layer (PHY) specifications: Amendment: Medium Access Control (MAC) Quality of Service (QoS) Enhancements, IEEE Standard for Information technology, Jan. 2005, i-xvi;1-182, IEEE P802.11e/D13.0, The Institute of Electrical and Electronics Engineers, Inc. <URL: http://standards.ieee.org/reading/ieee/std/lanman/drafts/P802.11e.pdf>, New York, NY, USA.

\* cited by examiner

FIG.7

| | TX_Power |
|---|---|
| STA103 | — |
| AP101 | — |

FIG.8

| | TX_Power |
|---|---|
| STA103 | 20 |
| AP101 | — |

FIG.10

| | TX_Power |
|---|---|
| STA103 | 10 |
| AP101 | — |

FIG.12

|  | TX_Power | TPC_time |
|---|---|---|
| STA103 | — | — |
| AP101 | — | — |

FIG.13

|  | TX_Power | TPC_time |
|---|---|---|
| STA103 | 20 | 10000 |
| AP101 | — | — |

FIG.14

|  | TX_Power | TPC_time |
|---|---|---|
| STA103 | 10 | 12000 |
| AP101 | — | — |

FIG.16

|        | RSSI |
|--------|------|
| STA103 | —    |
| AP101  | —    |

FIG.17

|        | RSSI |
|--------|------|
| STA103 | −60  |
| AP101  | —    |

FIG.18

|        | TX_Power | RSSI |
|--------|----------|------|
| STA103 | —        | —    |
| AP101  | —        | —    |

FIG.19

|  | TX_Power | RSSI |
|---|---|---|
| STA103 | — | -60 |
| AP101 | — | — |

FIG.20

| TSID | TX_Power | RSSI ||
|---|---|---|---|
|  |  | STA103 | AP101 |
| 15 | — | — | — |
| 14 | — | — | — |

FIG.21

| TSID | TX_Power | RSSI ||
|---|---|---|---|
|  |  | STA103 | AP101 |
| 15 | — | -60 | — |
| 14 | — | — | — |

FIG.23

| TSID | TX_Power | RSSI | |
| --- | --- | --- | --- |
| | | STA103 | AP101 |
| 15 | 20 | — | — |
| 14 | — | — | — |

FIG.24

| TSID | TX_Power | RSSI | |
| --- | --- | --- | --- |
| | | STA103 | AP101 |
| 15 | 20 | −60 | — |
| 14 | — | — | — |

FIG.26

|  | RSSI | Measurement Start time |
|---|---|---|
| STA103 | — | 0 |
| AP101 | — | 0 |

FIG.27

|  | RSSI | Measurement Start time |
|---|---|---|
| STA103 | −60 | 10000 |
| AP101 | — | 0 |

FIG.28

| | TX_Power | TPC_time | RSSI | Measurement Start time |
|---|---|---|---|---|
| STA103 | — | — | — | 0 |
| AP101 | — | — | — | 0 |

FIG.29

| | TX_Power | TPC_time | RSSI | Measurement Start time |
|---|---|---|---|---|
| STA103 | 20 | 7000 | −60 | 10000 |
| AP101 | − | − | − | 0 |

FIG.31

| | TX_Power | TPC_time | RSSI | Measurement Start time |
|---|---|---|---|---|
| STA103 | 20 | 7000 | — | 0 |
| AP101 | — | — | — | 0 |

FIG.32

| | TX_Power | TPC_time | RSSI | Measurement Start time |
|---|---|---|---|---|
| STA103 | 20 | 7000 | −60 | 6000 |
| AP101 | − | − | − | 0 |

FIG.33

| | TX_Power | TPC_time | RSSI | Measurement Start time |
|---|---|---|---|---|
| STA103 | 10 | 12000 | −60 | 10000 |
| AP101 | — | — | — | 0 |

| TSID | TX Power | RSSI | |
| --- | --- | --- | --- |
| | | STA103 | AP101 |
| 15 | 20 | -60 | -65 |
| 14 | — | — | — |

| RPI | Power Observed at the Antenna (dBm) |
|---|---|
| 0 | Power $\leq$ -87 |
| 1 | -87 < Power $\leq$ -82 |
| 2 | -82 < Power $\leq$ -77 |
| 3 | -77 < Power $\leq$ -72 |
| 4 | -72 < Power $\leq$ -67 |
| 5 | -67 < Power $\leq$ -62 |
| 6 | -62 < Power $\leq$ -57 |
| 7 | -57 < Power |

RADIO COMMUNICATION DEVICE, RADIO COMMUNICATION SYSTEM AND MEASUREMENT METHOD CAPABLE OF CONDUCTING APPROPRIATE TRANSMIT POWER CONTROL

This nonprovisional application is based on Japanese Patent Application Nos. 2004-355330 and 2005-308587 filed with the Japan Patent Office on Dec. 8, 2004 and Oct. 24, 2005, respectively, the entire contents of which are hereby incorporated by reference.

BACKGROUND OF THE INVENTION

1. Field of the Invention

The present invention relates to a radio communication device, a radio communication system and a measurement method, and more particularly to a radio communication device, a radio communication system and a measurement method capable of performing communication control as represented by transmit power control of signals (frames) based on communication quality.

2. Description of the Background Art

A radio communication device, such as a portable phone, a PHS (Personal Handyphone System), a note type personal computer provided with a wireless LAN (Local Area Network) function or the like, operates with a battery as its power source. To prolong usage of the radio communication device, reduction of consumed power is an important issue. In order to decrease power consumption, it is particularly effective to restrict transmit power.

For the purpose of restricting the transmit power, a control method as follows, for example, has been employed. A radio communication device on the receiving side measures received field strength based on radiowaves transmitted from a radio communication device on the transmitting side, and transmits information of the received field strength measured to the radio communication device on the transmitting side. The radio communication device on the transmitting side refers to the information of received field strength received from the radio communication device on the receiving side, and transmits data by setting transmit power to a lower value within the range not impairing the communication.

There are IEEE standards 802.11 among wireless LAN standards. IEEE 802.11 includes standards defined by several task groups. A standard defined by a major task group is called IEEE 802.11h, which defines the standard for operation in the 5 GHz band in Europe. IEEE 802.11h defines TPC (Transmit Power Control) and DFS (Dynamic Frequency Selection) for reducing power consumption in a radio communication device. TPC is a function of controlling transmit power in accordance with a condition such as a distance between a STA (STAtion) that is a terminal station identified as a radio communication device and an AP (Access Point) that is a control station as will be described below. DFS is a function of dynamically changing radio channels in accordance with their qualities and automatically selecting a radio channel free of interference or the like. Such techniques are disclosed in "IEEE Std 802.11h-2003".

IEEE 802.11e is a standard defined by another task group. In the draft of IEEE 802.11e, QoS (Quality of Service) guaranteed communication, DLS (Direct Link Setting) mechanism and others are defined, while maintaining compatibility with MAC (Medium Access Control) standards of IEEE 802.11. QoS is a technique of guaranteeing a constant communication speed by securing a band for transmitting streams and others over the network. DLS is a mechanism for allowing direct communication between STAs, which are terminal stations identified as the radio communication devices, without intervention of an AP. Such techniques are disclosed in "IEEE P802.11e/D13.0".

Hereinafter, a procedure where a STA (radio communication device) 1102 uses DLS to perform TPC will be described with reference to FIGS. 45-49. FIG. 45 schematically shows an infrastructure network configured with a single BSS (Basic Service Set) 1110. BSS 1110 may include, for example, an AP 1101, which is a radio communication device set as a control station, and STA 1102 and STA1103, which are radio communication devices. Herein, it is assumed that STA 1102 is the radio communication device on the transmitting side (transmitting station) that transmits frames originally intended to be transmitted, and STA 1103 is the radio communication device on the receiving side (receiving station) that receives the frames originally intended to be transmitted which have been transmitted from STA 1102.

FIG. 46 shows the processing flow where STA 1102 on the transmitting side transmits frames by controlling transmit power. Firstly, STA 1102 on the transmitting side transmits a frame (Measurement Request Frame) 3900 to instruct STA 1103 on the receiving side to measure quality of a radio channel (hereinafter, also referred to as "communication quality") (step S (hereinafter, abbreviated as "S") 3800).

Here, frame (Measurement Request Frame) 3900 is described. FIG. 47 shows a frame format of a part of frame (Measurement Request Frame) 3900. Frame (Measurement Request Frame) 3900 has the part where measurement conditions are designated in measurement type (Measurement Type) field 3901, a measurement channel (Channel Number) field 3902, a measurement start time (Measurement Start Time) field 3903, and a measurement duration (Measurement Duration) field 3904.

Referring again to FIG. 46, STA 1103 on the receiving side having received frame (Measurement Request Frame) 3900 performs measurement of communication quality in accordance with the measurement conditions designated in frame (Measurement Request Frame) 3900 (S3805). STA 1103 measures received field strength, for example, as the communication quality. Thereafter, STA 1103 on the receiving side transmits to STA 1102 a frame (Measurement Report Frame) 4000 showing information of communication quality (hereinafter, also referred to as "communication quality information") that is the measurement result (S3810).

Here, frame (Measurement Report Frame) 4000 is described. FIG. 48 shows a frame format of a part of frame (Measurement Report Frame) 4000. FIG. 49 shows definition of RPI (Receive Power Indicator) histogram information for each received level. Frame (Measurement Report Frame) 4000 has the part where a measurement type (Measurement Type) field 4001, a measurement channel (Channel Number) field 4002, a measurement start time (Measurement Start Time) field 4003, and a measurement duration (Measurement Duration) field 4004 are specified. When measurement type field 4001 specifies the RPI histogram information as shown in FIG. 49, time density histogram information for respective received levels (PRI0 density 4010 to PRI7 density 4017) as shown in FIG. 48 is recorded on frame 4000. Herein, stream data of which RPI is K (natural number) is represented as RPIK.

STA 1102 controls transmit power of the frames to be transmitted to STA 1103 based on the time density histogram information of each received level recorded on the received frame (Measurement Report Frame) 4000, and transmits the frames originally intended to be transmitted (S3815).

The above-described control method for restricting transmit power, however, has the following problems. The communication protocol of IEEE 802.11 adapts a CSMA/CA (Carrier Sense Multiple Access/Collision Avoidance) method. CSMA/CA is means for avoiding contention when a plurality of STAs access one and the same channel. Specifically, in order to permit equal communication opportunities to all the STAs and to avoid interference, it is configured such that a STA refrains from transmitting radiowaves while detecting radiowaves from another STA.

When not detecting radiowaves from another STA over a prescribed time period, the STA transmits radiowaves after a lapse of random back-off time. That is, during the time when STA 1103 is performing measurement of communication quality, the radiowaves transmitted from AP 1101 or another STA other than STA 1102 cannot be rejected completely. This means that the communication quality information measured by STA 1103 so as to enable STA 1102 to perform transmit power control may not be effective. In such a case, STA 1102 cannot perform proper control of transmit power based on the communication quality information recorded on frame (Measurement Report Frame) 4000.

Meanwhile, in the draft of IEEE 802.11e, HCCA (HCF (Hybrid Coordination Function) Controlled Channel Access) is defined as a mechanism for conducting QoS guaranteed communication. In HCCA, a HC (Hybrid Coordinator) assigns to a STA a right (hereinafter, referred to as "communication right") permitting transmission of frames over a prescribed period, and the STA assigned with the communication right can transmit frames to another STA over the prescribed period.

The function as the HC performing control of assignment of the communication right is also carried out by AP 1101. STA 1102 does not know in which timing and how long the communication right will be assigned by AP 1101, and thus, it cannot transmit frame (Measurement Request Frame) 3900 to STA 1103 to cause it to measure communication quality by rejecting the radiowaves transmitted from another STA.

Even in the case where STA 1102 somehow knows the timing and period for assignment of the communication right and transmits frame (Measurement Request Frame) 3900 for measurement of communication quality, there may be a case where the transmitting station, STA 1102, transmits the frame not only to STA 1103 but also to another STA. In such a case, the transmitting station, STA 1102, will have to transmit frame (Measurement Request Frame) 3900 to a plurality of STAs for conducting the control of transmit power. In order to transmit frame (Measurement Request Frame) 3900 to a plurality of STAs, the transmitting station, STA 1102, needs to calculate and adjust the timings for transmitting frame (Measurement Request Frame) 3900, the measurement start times, the measurement durations and others. This complicates the mechanism of the transmitting station, STA 1102, and accordingly, the device cost for implementing the transmit power control will increase.

In IEEE 802.11h, the mechanism called Quiet prohibiting transmission of radiowaves over a designated channel for a certain period is defined. With Quiet, however, all the STAs in BSS 1110 are prohibited from transmitting radiowaves, which cannot solve the above-described problems.

SUMMARY OF THE INVENTION

An object of the present invention is to provide a radio communication device, a radio communication system and a measurement method capable of conducting appropriate measurement of communication quality and excellent in general versatility.

Another object of the present invention is to provide a radio communication device, a radio communication system and a measurement method capable of conducting appropriate transmit power control and excellent in general versatility.

According to an aspect of the present invention, a radio communication device receiving a signal from another radio communication device transmitting a signal, when receiving a communication permission signal assigning a communication right permitting transmission of signals by defining a prescribed period from a radio communication device serving as a control station, includes: a received signal analysis portion for analyzing a received signal; and a measurement portion for measuring communication quality. When the received signal analysis portion determines that the received signal is the communication permission signal assigning the communication right to the other radio communication device, the measurement portion measures the communication quality with the other radio communication device within the prescribed period.

According to the invention, only the radio communication device assigned with the communication right can transmit signals during the prescribed period. Thus, the radio communication device measuring communication quality can measure the communication quality by avoiding interference attributable to radiowaves transmitted from another radio communication device not assigned with the communication right.

Further, since the radio communication device assigned with the communication right transmits signals, and another radio communication device receiving the signal assigning the communication right to the radio communication device measures communication quality, communication quality with a plurality of radio communication devices can be measured without provision of a complicated mechanism in the radio communication device.

Still further, measurement of quality of a radio channel can be performed by avoiding interference from another radio communication device, without the need of providing the radio communication device with an adjustment mechanism for designating measurement start time or measurement duration of measurement of the communication quality. As a result, the device cost can be reduced, and a radio communication device excellent in general versatility can be obtained.

Furthermore, since the communication quality is measured in the prescribed period during which the radio communication device assigned with the communication right is transmitting signals, measurement of the communication quality does not interrupt other communication. The measurement result by the radio communication device may also be used for communication control as a threshold value for determination of discontinuation of repetitive decoding of error correction or the like.

Preferably, the radio communication device further includes a communication quality transmitting portion for transmitting a quality information signal indicating a measurement result of the communication quality measured by the measurement portion, to the other radio communication device assigned with the communication right.

According to the invention, the signal indicating the measurement result of communication quality measured can be transmitted to the other radio communication device by the communication quality transmitting portion. As such, it is possible to provide a radio communication device excellent in general versatility and capable of performing appropriate transmit power control using the measurement result of the communication quality.

According to another aspect of the present invention, a radio communication device transmitting a signal to another radio communication device, when receiving a communication permission signal assigning a communication right permitting transmission of signals by defining a prescribed period from a radio communication device serving as a control station, includes: a received signal analysis portion for analyzing a received signal; a transmit power control portion for controlling transmit power of a transmit signal to be transmitted to the other radio communication device; and a transmit power information storage portion for storing transmit power information that is information of the transmit power controlled by the transmit power control portion. When the received signal analysis portion determines that the received signal is addressed to the own device and that the received signal is a quality information signal indicating communication quality with the own device measured by the other radio communication device within the prescribed period, the transmit power control portion controls the transmit power of the transmit signal to be transmitted to the other radio communication device based on the transmit power information and a measurement result of the communication quality indicated by the quality information signal.

According to the invention, the transmit power of the signal transmitted to the other radio communication device can be restricted to the minimum required level, and thus, power consumption of the radio communication device can be reduced.

Preferably, the transmit power information storage portion further stores transmit power control time indicating the time when the transmit power of the transmit signal was controlled by the transmit power control portion, and the quality information signal includes information indicating a measurement start time of the communication quality. When the received signal analysis portion determines that the received signal is addressed to the own device, that the received signal is the quality information signal, and that the measurement start time of the communication quality is later than the transmit power control time, then the transmit power control portion controls the transmit power of the transmit signal to be transmitted to the other radio communication device using the transmit power information and a measurement result of the communication quality indicated by the quality information signal.

According to the invention, even if the signal indicating the measurement result of the communication quality received after the transmit power control is the one measured before the transmit power control, erroneous transmit power control can be prevented.

According to yet another aspect of the present invention, a radio communication device serving as a receiving station performing communication with a transmitting station to which a control station assigns a communication right permitting transmission of signals for a prescribed period, includes: a measurement portion for measuring communication quality with the transmitting station within the prescribed period when receiving a signal assigning the communication right to the transmitting station.

According to the invention, it is possible to measure the communication quality with the transmitting station by eliminating interference from another radio communication device.

According to yet another aspect of the present invention, a radio communication device serving as a receiving station performing communication with a transmitting station to which a control station assigns a communication right permitting transmission of signals for a prescribed period, includes: a measurement portion for measuring communication quality with the transmitting station within the prescribed period when recognizing that the communication right has been assigned to the transmitting station.

According to the invention, the radio communication device measures the communication quality within the prescribed period when recognizing that the communication right has been assigned to the transmitting station, regardless of the presence or absence of a signal assigning the communication right. Thus, the communication quality with the transmitting station can be measured, while eliminating interference from another radio communication device, even if the signal (Poll frame or the like) assigning the communication right is not received.

Preferably, the radio communication device further includes a communication quality transmitting portion for transmitting to the transmitting station measurement information including at least a measurement result of the communication quality measured by the measurement portion.

According to the invention, the transmitting station can perform communication control based on the communication quality information measured by the receiving station from which interference from another radio communication device is eliminated.

Preferably, the radio communication device further includes a received signal determination portion for determining a received signal. The received signal determination portion determines whether the received signal is a signal firstly transmitted after assignment of the communication right, and when the received signal determination portion determines that it is the firstly transmitted signal, the measurement portion performs measurement of the communication quality excluding the firstly transmitted signal.

In the invention, the signal transmitted firstly after assignment of the communication right has its transmit power controlled to enable the control station to receive it as well. The above configuration enables more accurate measurement of the communication quality excluding the relevant signal.

Preferably, when the received signal determination portion determines that the received signal is a signal indicating that the prescribed period corresponding to the communication right expires, the measurement portion terminates measurement of the communication quality.

According to the invention, communication quality can be measured for only the signals transmitted from the transmitting station to the receiving station.

Preferably, the radio communication device has a function of assigning the communication right permitting transmission of signals for the prescribed period to the transmitting station.

According to the invention, the receiving station having the control function can measure communication quality in the uplink state.

According to yet another aspect of the present invention, a radio communication device serving as a transmitting station communicating with a receiving station when a communication right permitting transmission of signals for a prescribed period is assigned from a control station, includes: a transmit power control portion for controlling transmit power of a transmit signal to be transmitted to the receiving station based on a measurement result of communication quality with the receiving station.

According to the invention, the transmitting station can reduce the transmit power without impairing communication with the receiving station, whereby the effect of lowering power consumption is obtained.

Preferably, the communication quality is measured within the prescribed period.

According to the invention, appropriate transmit power control is possible while eliminating interference from another radio communication device.

Preferably, the communication quality is measured in the receiving station, and the radio communication device receives measurement information including at least a measurement result of the communication quality from the receiving station.

According to the invention, transmit power control can be carried out based on the communication quality information measured in the receiving station.

Preferably, the radio communication device further includes a transmit power information storage portion for storing information of the transmit power. The transmit power control portion controls transmit power of a transmit signal to be transmitted to the receiving station based on the information of the transmit power stored in the transmit power information storage portion and the measurement result of the communication quality.

According to the invention, propagation loss of radiowaves between the transmitting station and the receiving station can be obtained with accuracy based on the communication quality information having interference from another radio communication device eliminated and the transmit power information stored. This enables appropriate transmit power control.

Preferably, the transmit power information storage portion further stores a transmit power control time indicating the time when the transmit power control portion controlled the transmit power of the transmit signal to be transmitted to the receiving station, and the measurement information further includes a measurement start time of the communication quality. When the measurement start time is later than the transmit power control time, the transmit power control portion controls the transmit power of the transmit signal to be transmitted to the receiving station based on the information of the transmit power stored in the transmit power information storage portion and the measurement result of the communication quality.

According to the invention, erroneous transmit power control can be prevented even if a measurement result of the communication quality measured before controlling the transmit power is received.

Preferably, the radio communication device further includes a communication quality storage portion for storing the measurement information when receiving the measurement information from the receiving station.

According to the invention, only the required measurement result of communication quality can be stored, and communication quality information from the receiving station to which signals have not been transmitted can be stored.

Preferably, the transmit power control portion controls the transmit power of the transmit signal to be transmitted to the receiving station based on the measurement information stored in the communication quality storage portion and the information of the transmit power stored in the transmit power information storage portion.

According to the invention, transmit power of the signal to be transmitted to the receiving station can be controlled based on the communication quality information received from the receiving station and stored as well as the transmit power information.

Preferably, when the measurement start time of the communication quality included in the measurement information stored in the communication quality storage portion is later than the transmit power control time stored in the transmit power information storage portion, the transmit power control portion controls the transmit power of the transmit signal to be transmitted to the receiving station based on the measurement result of the communication quality included in the measurement information stored in the communication quality storage portion and the information of the transmit power stored in the transmit power information storage portion.

According to the invention, transmit power of the signal to be transmitted to the receiving station can be controlled based on the communication quality information received from the receiving station and stored, and the transmit power information. Thus, it is unnecessary to await the measurement result of communication quality from the receiving station.

Preferably, the radio communication device further includes a transmit signal determination portion for determining whether the transmit signal to be transmitted to the receiving station is a signal that is firstly transmitted after assignment of the communication right. When the transmit signal determination portion determines that the transmit signal is the firstly transmitted signal, the transmit power control portion controls the transmit power of the transmit signal to power that can be received by the receiving station and the control station.

According to the invention, the transmit signal is transmitted with the transmit power that can be received not only by the receiving station as the destination of the signal but also by the control station. This avoids the situation where the control station erroneously determines that the transmitting station assigned with the communication right did not transmit a signal, and thus, assignment of the communication right to another radio communication device can be prevented.

Preferably, the transmit signal determination portion further determines whether the transmit signal is a signal that is to be transmitted to a plurality of receiving stations. When the transmit signal determination portion determines that the transmit signal is the signal to be transmitted to the plurality of receiving stations, the transmit power control portion controls the transmit power of the transmit signal to prescribed power.

According to the invention, it is possible to transmit the signal, without causing delay in communication with a plurality of receiving stations.

Preferably, the radio communication device has a function of assigning the communication right permitting transmission of signals during the prescribed period.

According to the invention, transmit power can be controlled appropriately in the downlink state even if the transmitting station assigns a communication right to the own device.

According to yet another aspect of the present invention, a radio communication system is configured with a control station assigning a communication right permitting transmission of signals for a prescribed period, and a second radio communication device capable of receiving a signal transmitted from a first radio communication device assigned with the communication right. The second radio communication device includes a received signal analysis portion for analyzing a received signal, and a measurement portion for measuring communication quality with the first radio communication device within the prescribed period when the received signal analysis portion determines that the received signal is a signal assigning the communication right to the first radio communication device.

According to the invention, only the radio communication device assigned with the communication right can transmit signals during the prescribed period. Thus, the radio communication device measuring communication quality can measure the communication quality by avoiding interference attributable to radiowaves transmitted from another radio communication device not assigned with the communication right.

Further, since the radio communication device assigned with the communication right transmits signals, and the radio communication device not assigned with the communication right measures communication quality, communication quality with a plurality of radio communication devices can be measured without provision of a complicated mechanism in the radio communication device.

Still further, measurement of communication quality can be performed by avoiding interference from another radio communication device, without provision of an adjustment mechanism for designating measurement start time or measurement duration of measurement of the communication quality in the radio communication device. As a result, the device cost can be reduced, and a radio communication system excellent in general versatility can be obtained.

Furthermore, since the communication quality is measured in the prescribed period during which the radio communication device assigned with the communication right is transmitting signals, measurement of the communication quality does not interrupt other communication, leading to effective use of the band. The result of the measurement by the radio communication device may also be used for communication control as a threshold value for determination of discontinuation of repetitive decoding in error correction or the like.

Preferably, the second radio communication device further includes a communication quality transmitting portion for transmitting to the first radio communication device a signal indicating a measurement result of the communication quality measured by the measurement portion.

According to the invention, the signal indicating the communication quality measured by the measurement portion can be transmitted to the first radio communication device. As such, it is possible to provide a radio communication system excellent in general versatility and capable of performing appropriate transmit power control using the measurement result of the communication quality.

Preferably, the first radio communication device includes a transmitting portion for transmitting a signal to the second radio communication device, a transmit power control portion for controlling transmit power of a transmit signal to be transmitted to the second radio communication device, and a transmit power information storage portion for storing transmit power information that is the information of the transmit power controlled by the transmit power control portion. When the first radio communication device assigned with the communication right by the control station receives a measurement result of the communication quality transmitted from the second radio communication device, the transmit power control portion controls the transmit power of the transmit signal to be transmitted to the second radio communication device based on the transmit power information stored in the transmit power information storage portion and the measurement result of the communication quality.

According to the invention, it is possible to restrict the transmit power of the signal to be transmitted to the second radio communication device to the minimum required level, whereby power consumption of the radio communication device can be reduced.

According to yet another aspect of the present invention, a measurement method is for causing a radio communication device serving as a receiving station to perform measurement processing, wherein the radio communication device serving as the receiving station communicates with a transmitting station to which a control station assigns a communication right permitting transmission of signals for a prescribed period. The method includes the step of recognizing that the communication right has been assigned to the transmitting station; and the step of measuring communication quality with the transmitting station within the prescribed period when it is recognized that the communication right has been assigned to the transmitting station.

According to the invention, the radio communication device measures the communication quality within the prescribed period when recognizing that the communication right has been assigned to the transmitting station, regardless of the presence or absence of a signal assigning the communication right. Thus, it can measure communication quality with the transmitting station, while eliminating interference from another radio communication device, even if the signal assigning the communication right is not received.

Preferably, the step of measuring the communication quality includes the step of measuring received field strength within the prescribed period.

According to the invention, the received field strength can be measured.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows an initial state of a storage table that can store transmit power information.

FIG. 8 shows an example of the storage table having transmit power information stored therein.

FIG. 10 shows an example of the storage table having transmit power information stored therein.

FIG. 12 shows an initial state of a storage table that can store transmit power information and transmit power control time.

FIGS. 13 and 14 show examples of the storage table having transmit power information and transmit power control time stored therein.

FIG. 16 shows an initial state of a storage table that can store communication quality information.

FIG. 17 shows an example of the storage table having communication quality information stored therein.

FIG. 18 shows an initial state of a storage table that can store transmit power information and communication quality information.

FIG. 19 shows an example of the storage table having communication quality information stored therein.

FIG. 20 shows an initial state of a storage table that can store transmit power information and communication quality information.

FIG. 21 shows an example of the storage table having communication quality information stored therein.

FIG. 23 shows an example of the storage table having transmit power information stored therein.

FIG. 24 shows an example of the storage table having communication quality information and transmit power information stored therein.

FIG. 26 shows an initial state of a storage table that can store communication quality information and communication quality measurement start time.

FIG. 27 shows an example of the storage table having communication quality information and communication quality measurement start time stored therein.

FIG. 28 shows an initial state of a storage table that can store transmit power information and transmit power control time, and communication quality information and communication quality measurement start time.

FIG. 29 shows an example of the storage table having transmit power information and transmit power control time, and communication quality information and communication quality measurement start time stored therein.

FIG. 31 shows an example of the storage table having transmit power information and transmit power control time stored therein.

FIGS. 32 and 33 show examples of the storage table having transmit power information and transmit power control time, and communication quality information and communication quality measurement start time stored therein.

DESCRIPTION OF THE PREFERRED EMBODIMENTS

Figure 1:
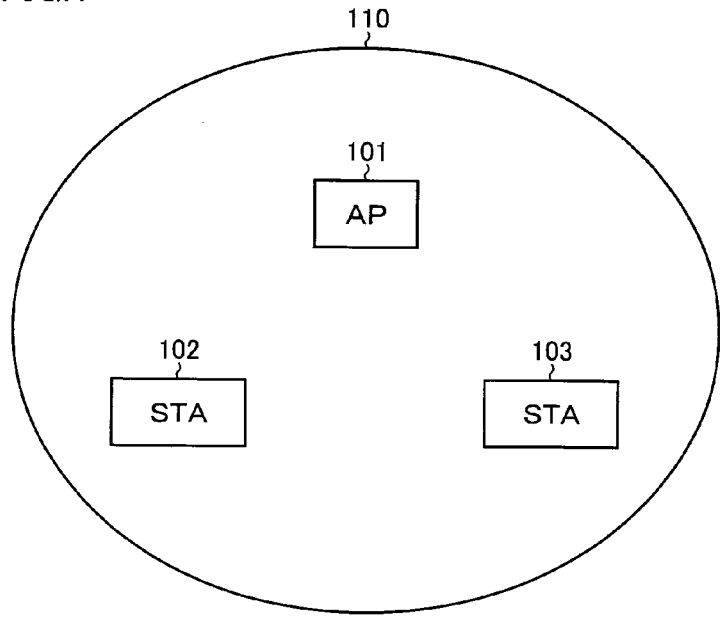
FIG. 1 schematically shows an infrastructure network configured with a single BSS (Basic Service Set).

Hereinafter, embodiments of the present invention will be described in detail with reference to the drawings. In the following description, the same portions have the same reference characters allotted, and have the same names and functions. Thus, detailed description thereof will not be repeated.

First Embodiment

The first embodiment of the present invention will now be described with reference to FIGS. 1-10. In the first embodiment, description will be made as to how a STA 102 assigned with a communication right controls transmit power when transmitting stream data to a STA 103. In the first embodiment, it is assumed that stream data having its stream identifier TSID (Traffic Stream IDentifier) of "15" is transmitted from STA 102 to STA 103. In the following, stream data having TSID of L (natural number) is expressed as TSIDL.

Firstly, description will be made, with reference to FIGS. 1-4, about the flow where STA 103 serving as a receiving station measures quality of a radio channel (communication quality) for transmitting/receiving frames to/from STA 102, and transmits a frame indicating communication quality information being the measurement result to STA 102.

FIG. 1 schematically shows an infrastructure network configured with a single BSS (Basic Service Set) 110. An AP 101 is a radio communication device set as a control station. When permission for transmitting frames is requested from STA 102 or STA 103, AP 101 transmits a Poll frame (QoS-CF-Poll frame) for assigning a communication right permitting transmission of frames by defining a prescribed period (i.e., AP 101 also serves as the HC). Since the first embodiment assumes that STA 102 transmits stream data to STA 103, AP 101 transmits the Poll frame for assigning the communication right to STA 102.

Figure 2:
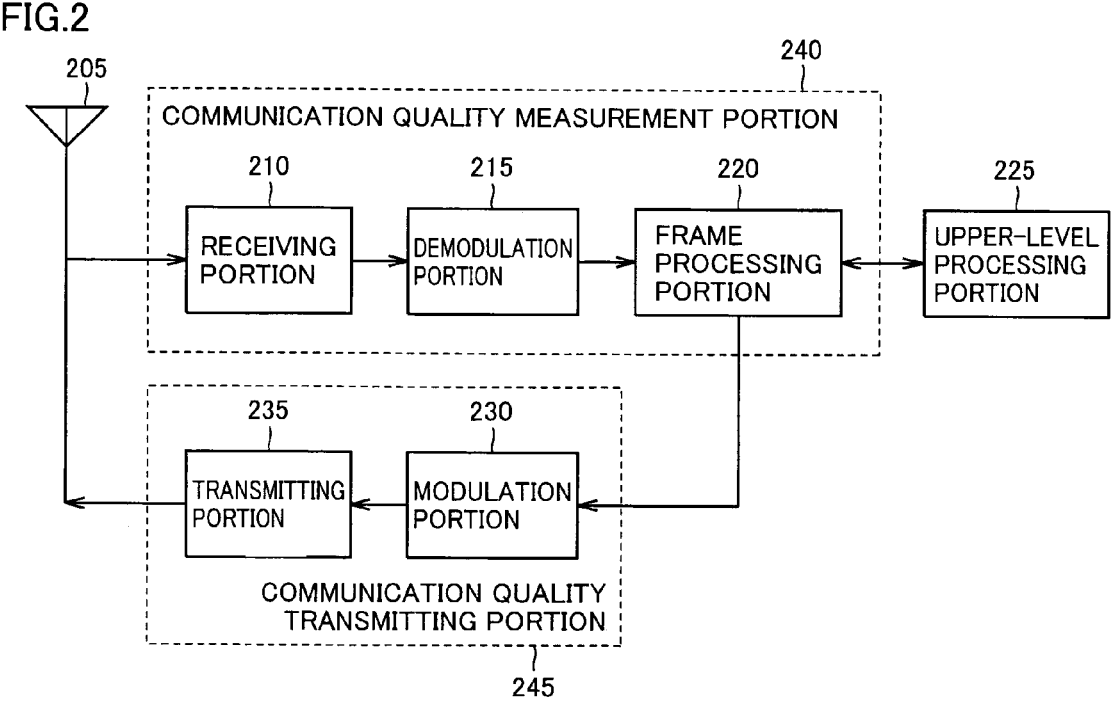
FIG. 2 is a functional block diagram of a STA that performs measurement of communication quality.

FIG. 2 is a functional block diagram of STA 103 that performs measurement of communication quality. STA 103 includes an antenna 205, a receiving portion 210, a demodulation portion 215, a frame processing portion 220, an upper-level processing portion 225, a modulation portion 230, a transmitting portion 235, a communication quality measurement portion 240, and a communication quality transmitting portion 245. Receiving portion 210, demodulation portion 215 and frame processing portion 220 constitute a communication quality measurement portion 240. Communication quality measurement portion 240 is a measurement portion for measuring communication quality. Modulation portion 230 and transmitting portion 235 constitute a communication quality transmitting portion 245. Although not shown, frame processing portion 220 constitutes a received frame analysis portion.

Receiving portion 210 receives a modulated frame (signal) via antenna 205. In the following description, the "frame" is identical to the signal. Thus, the term "frame" herein may be replaced with "signal". Demodulation portion 215 demodulates the modulated frame received at receiving portion 210. Frame processing portion 220 reconstructs the frame demodulated by demodulation portion 215. Frame processing portion 220 transmits the reconstructed frame to upper-level processing portion 225. Modulation portion 230 modulates a frame to be transmitted to another radio communication device. Transmitting portion 235 transmits the frame modulated by modulation portion 230 to the other radio communication device via antenna 205.

Figure 3:
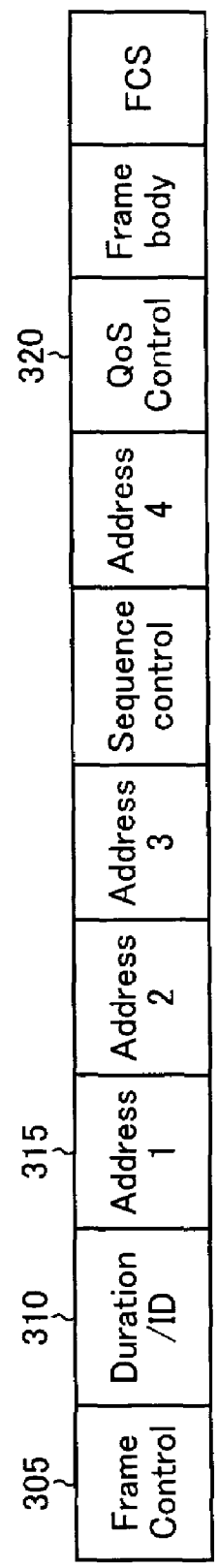
FIG. 3 shows an example of a frame format.

FIG. 3 shows an example of frame format. A frame is configured with header information including a Frame_Control field 305, a Duration/ID field 310, an Address 1 field 315, and a QoS_Control field 320, and payload data including a Frame_body field. In Frame_Control field 305, the type of the frame, for example, is indicated. In Duration/ID field 310, a reserved time until completion of frame transmission, for example, is indicated. In Address 1 field 315, a destination address, for example, is indicated. In QoS_Control field 320, a prescribed period during which transmission of the frames is permitted, a stream identifier TSID or the like, for example, is indicated.

Figure 4:
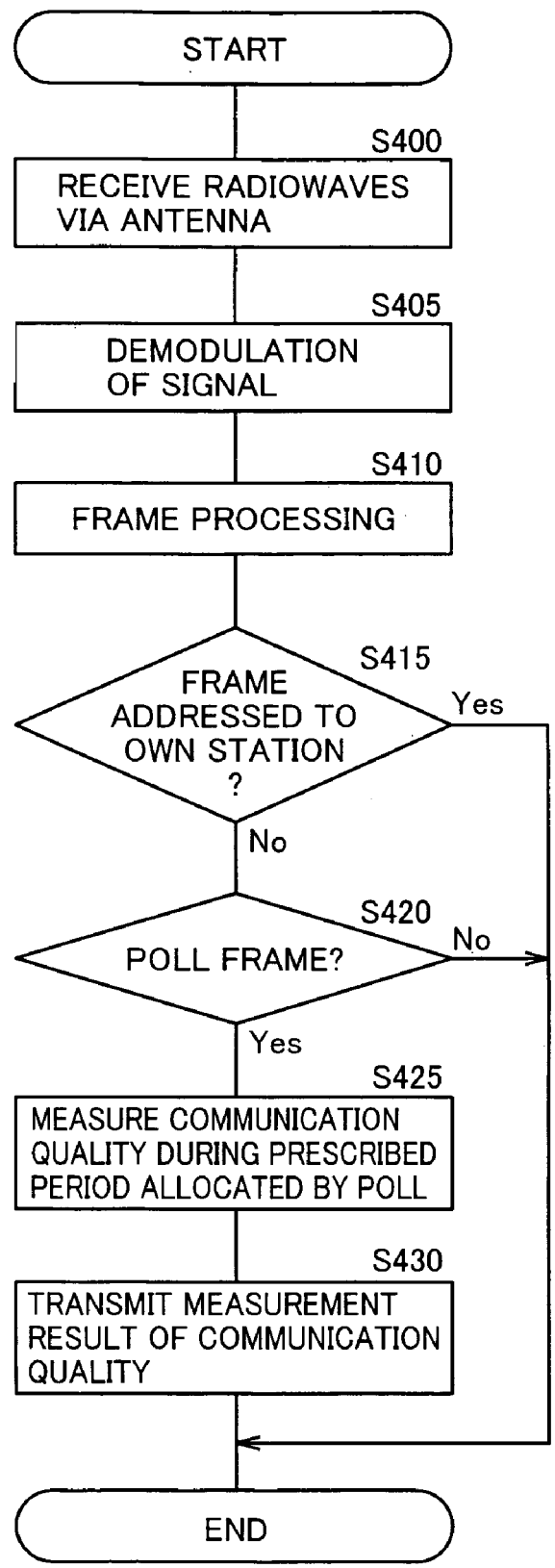
FIG. 4 is a flowchart illustrating processing of measuring the communication quality executed by the STA.

FIG. 4 is a flowchart illustrating processing of measuring communication quality that is executed by STA 103. In S400, receiving portion 210 receives a modulated frame via antenna 205. In S405, demodulation portion 215 demodulates the modulated frame received at receiving portion 210. In S410, frame processing portion 220 reconstructs the frame demodulated by demodulation portion 215, and transmits the reconstructed frame to upper-level processing portion 225.

In S415, frame processing portion 220 identified as the received frame analysis portion determines whether the frame is the one addressed to STA 103 by referring to Address 1 field 315 of the frame. If it is determined that the frame is addressed to STA 103, the flowchart is terminated without performing measurement of the communication quality. If it is determined that the frame is not addressed to STA 103, the process proceeds to S420.

In S420, frame processing portion 220 constituting the received frame analysis portion determines whether the frame is a Poll frame by referring to Frame_Control field 305 of the frame. If it is determined that the frame is not the Poll frame, the flowchart is terminated without performing measurement of the communication quality. If it is determined that the frame is the Poll frame, the process proceeds to S425.

In the first embodiment, AP 101 transmits a Poll frame to STA 102 to assign a communication right thereto, as described above. Therefore, frame processing portion 220 of STA 103 determines No in S415 and Yes in S420, and the process proceeds to S425.

In S425, frame processing portion 220 reads the prescribed period allocated by the Poll frame by referring to QoS_Control field 320 of the frame, for example. Communication quality measurement portion 240 performs processing of measuring the communication quality over the prescribed period read by frame processing portion 220.

Figures 48, 49:
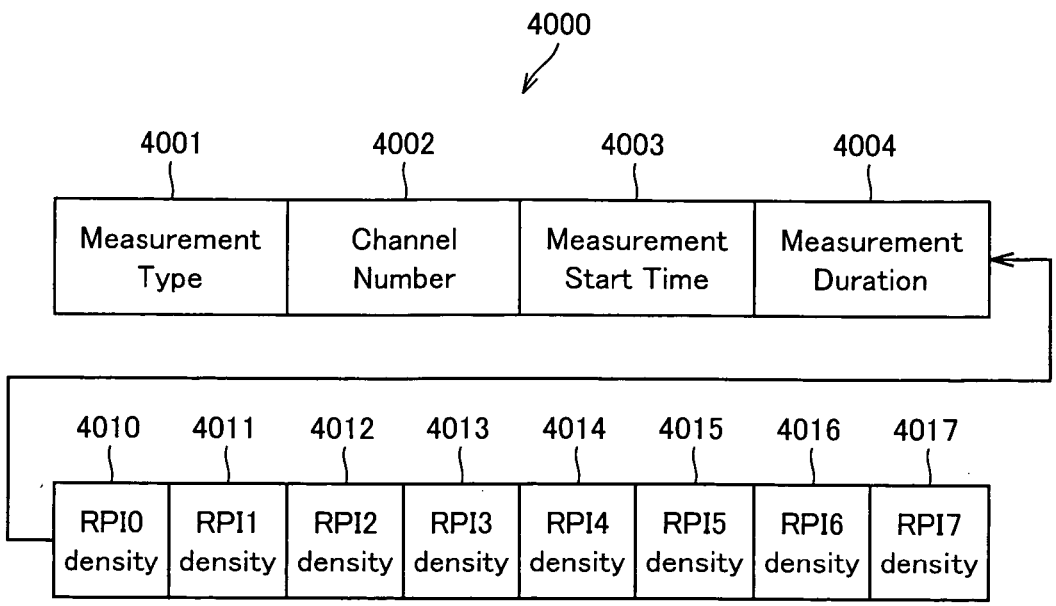
FIG. 48 shows a frame format of a part of a frame (Measurement Report Frame).
FIG. 49 shows definition of RPI (Receive Power Indicator) histogram information for each received level.

In the first embodiment, AP 101 transmits the Poll frame to STA 102. In response, STA 102 having received the Poll frame transmits stream data to STA 103 over the prescribed period designated by the Poll frame. Communication quality measurement portion 240 of STA 103 measures the communication quality of the frames transmitted from STA 102 within the prescribe period during which STA 102 is transmitting the stream data. The measurement result of the communication quality (communication quality information) obtained by communication quality measurement portion 240 is represented, e.g., as a time density histogram of the received field strength of eight levels as shown in FIGS. 48 and 49.

When the measurement of the communication quality is finished within the prescribed period, in S430, communication quality transmitting portion 245 of STA 103 refers to Address 1 field 315 of the Poll frame, and transmits a frame indicating the communication quality information to the destination (in the first embodiment, STA 102) shown in Address 1 field 315. The flowchart is then terminated.

It is noted that communication quality transmitting portion 245 of STA 103 may request for a communication right to AP 101 and transmit the frame indicating the communication quality information when the communication right is assigned by AP 101. Alternatively, even if the communication right is not assigned, it may transmit the frame indicating the communication quality information within the period (CP period (Contention Period) or EDCA (Enhanced Distributed Channel Access) period) during which the radio communication device having firstly obtained a communication band can transmit a frame to another radio communication device. Still alternatively, it may transmit the communication quality information together with an acknowledgement (e.g., ACK (ACKnowledgement) frame) when transmitting the acknowledgement within the period during which the communication quality is being measured.

Hereinafter, description will be made, with reference to FIGS. 5-10, about the flow where at the time when STA 102 transmits frames, frame processing portion 220 constituting a transmit power control portion 505 controls transmit power, and adds or updates the controlled transmit power information of the frames in a storage portion 515. Description will also be made about the flow where frame processing portion 220 controls the transmit power using communication quality information received and transmit power information stored in storage portion 515.

Figure 5:
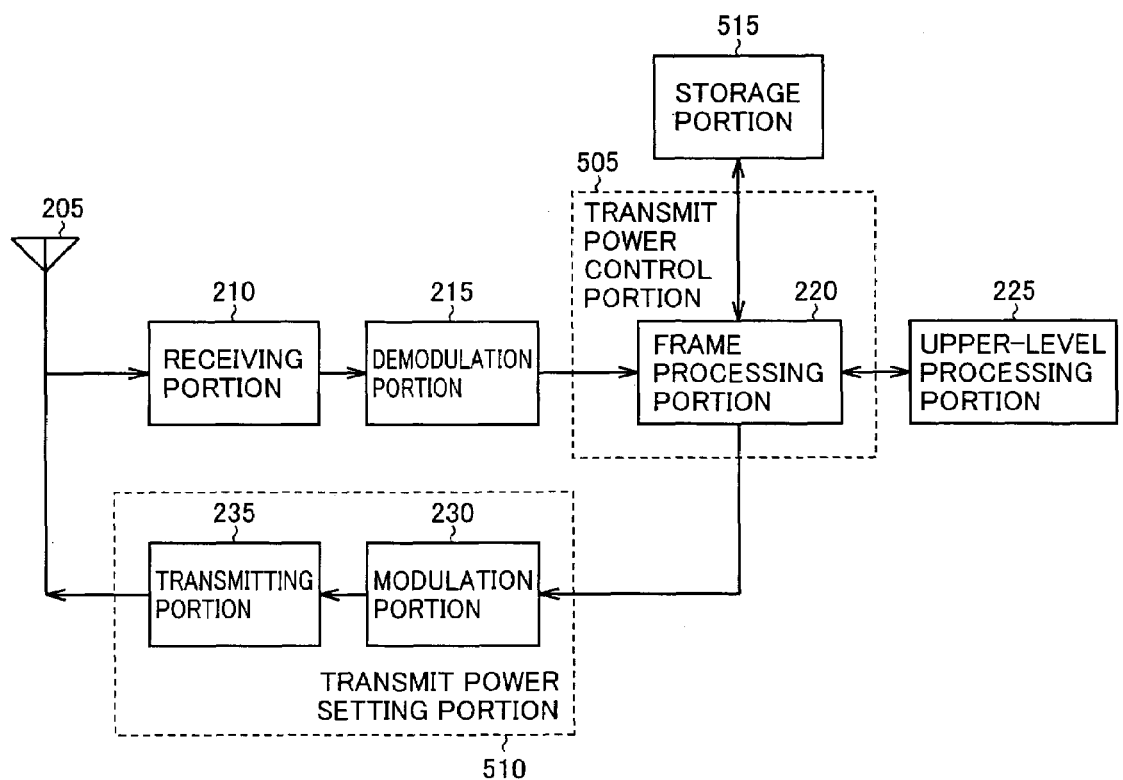
FIG. 5 is a functional block diagram of a STA that receives communication quality information and controls transmit power.

FIG. 5 is a functional block diagram of STA 102 that receives communication quality information and controls transmit power. STA 102 has the configuration approximately the same as that of STA 103. However, STA 102 differs from STA 103 in that it has a storage portion 515 for storing the transmit power information. Frame processing portion 220 constitutes a transmit power control portion 505. Modulation portion 230 and transmitting portion 235 constitute a transmit power setting portion 510.

Figure 6:
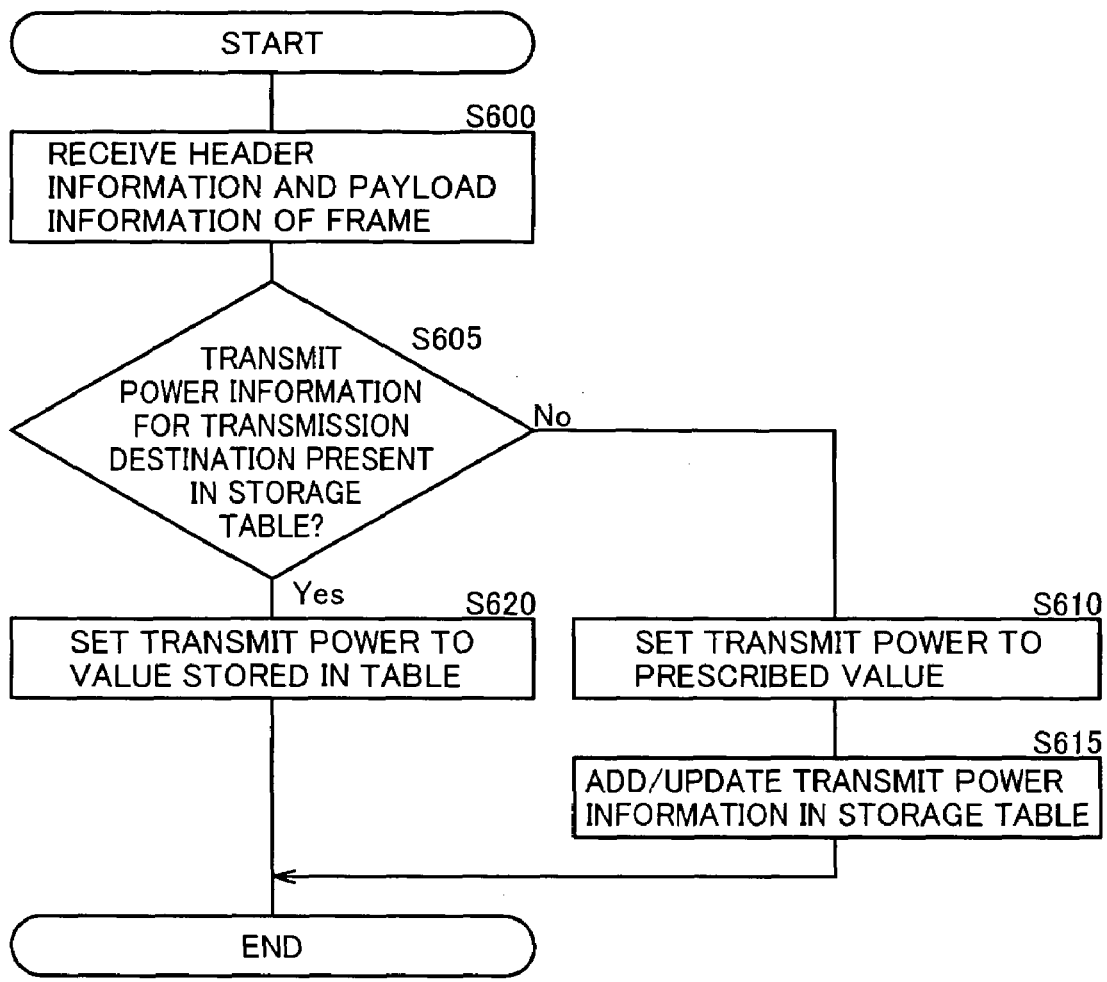
FIG. 6 is a flowchart illustrating processing of controlling the transmit power of frames executed by the STA.

FIG. 6 is a flowchart illustrating processing of controlling the transmit power of frames that is executed by STA 102. Firstly, in S600, frame processing portion 220 identified as transmit power control portion 505 receives from upper-level processing portion 225 header information and payload information of the frame to be transmitted. In S605, frame processing portion 220 refers to a storage table formed in storage portion 515 to see whether transmit power information for the radio communication device as the transmission destination has been stored.

Here, reference is made to FIGS. 7 and 8. FIG. 7 shows an initial state of the storage table that can store the transmit power information. As shown in FIG. 7, the storage table is configured to allow management of the transmit power information (TX_Power) for each radio communication device. In the first place, the storage table is in the state where transmit power information is not stored therein, as shown in FIG. 7. FIG. 8 shows an example of the storage table having the transmit power information stored therein. FIG. 8 shows the storage table storing "20" as the transmit power information for STA 103.

Referring again to FIG. 6, when frame processing portion 220 determines in S605 that transmit power information for the radio communication device as the transmission destination is not stored in the storage table, the process proceeds to S610. In S610, frame processing portion 220 sets the transmit power of the frames to a prescribed value. In S615, frame processing portion 220 adds the transmit power information set in S610 to the storage table. In the first embodiment, the case of transmitting stream data from STA 102 to STA 103 is explained. Thus, when the set transmit power is "20", for example, frame processing portion 220 adds "20" as the transmit power information to a cell of STA 103 in the storage table (in the initial state (where no frame has been transmitted before), transmit power information is not stored in the storage table, and thus, the process always follows this flow).

On the other hand, when frame processing portion 220 determines in S605 that the transmit power information for the radio communication device as the transmission destination is stored in the storage table, the process proceeds to S620. In S620, frame processing portion 220 sets the transmit power of the frames to the value stored in the storage table. In the first embodiment, the case of transmitting the stream data from STA 102 to STA 103 is explained. Thus, when "20" is stored as the transmit power information in the cell of STA 103 in the storage table as shown in FIG. 8, frame processing portion 220 sets "20" as the transmit power information of the frames.

Although the case of transmitting the stream data has been explained, not limited thereto, other data may also be transmitted.

Figure 9:
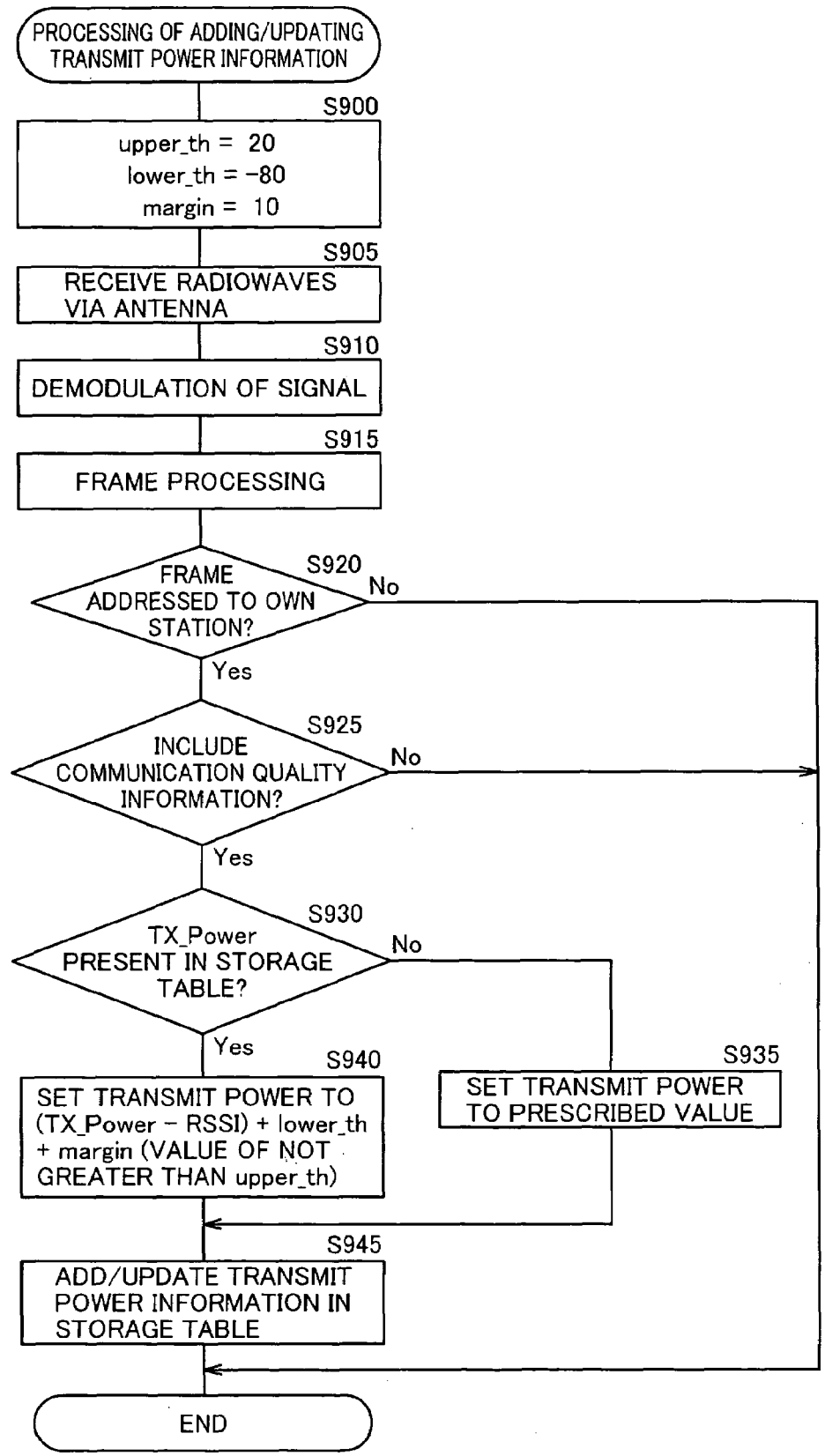
FIG. 9 is a flowchart illustrating processing of adding transmit power controlled based on communication quality information to the storage table as the transmit power information, or updating the storage table to reflect the same, which is executed by the STA.

FIG. 9 is a flowchart illustrating processing of adding the transmit power controlled based on the communication quality information to the storage table as the transmit power information, or updating the storage table to reflect the same, which is executed by STA 102. Firstly, in S900, frame processing portion 220 identified as the transmit power control portion sets an initial parameter.

As the initial parameter, frame processing portion 220 sets, for example, a transmit power upper limit (upper_th), a receive power lower limit (lower_th), a margin (margin) and the like. As upper_th, frame processing portion 220 sets, for example, the power of the upper limit acceptable under the law, the power corresponding to the performance limit of STA 102, or the like. In the first embodiment, frame processing portion 220 sets "20", for example, as upper_th. As lower_th, frame processing portion 220 sets the power of the lower limit acceptable under the radio communication standards, the power corresponding to the performance limit with which STA 103 can receive the frames stably, or the like. In the first embodiment, frame processing portion 220 sets "−80", for example, as lower_th. As margin, frame processing portion 220 sets, e.g., the power for allowing a drop of power due to the influences of fading, shadowing and others on the radio channel. In the first embodiment, frame processing portion 220 sets "10", for example, as margin. "lower_th+margin" becomes the receive power target in STA 103 serving as the receiving station. Herein, it is assumed that the target value is notified from STA 103 to STA 102 in advance.

In S905, receiving portion 210 receives a modulated frame via antenna 205. In S910, demodulation portion 215 demodulates the modulated frame received at receiving portion 210. In S915, frame processing portion 220 reconstructs the frame demodulated by demodulation portion 215, and transmits the reconstructed frame to upper-level processing portion 225.

In S920, frame processing portion 220 acting also as the received frame analysis portion refers to Address 1 field 315 of the frame, and determines whether the frame is addressed to STA 102. If it is determined that the frame is not addressed to STA 102, this flowchart is terminated without performing the processing of adding or updating the transmit power information in the storage table. If it is determined that the frame is addressed to STA 102, the process proceeds to S925.

In S925, frame processing portion 220 refers to Frame_Control field 305 and an Information_Element field (not shown) included in the payload data in the Frame_body field of the frame, and determines whether communication quality information is included or not. If it is determined that the communication quality information is not included, this flowchart is terminated without performing the processing of adding or updating the transmit power information in the storage table. If it is determined that the communication quality information is included, the process proceeds to S930.

In the first embodiment, STA 103 transmits the frame indicating the communication quality information to STA 102, as described above. Thus, frame processing portion 220 of STA 102 determines Yes in S920 and Yes in S925. The process then proceeds to S930.

In S930, frame processing portion 220 determines whether transmit power information "TX_Power" is stored in the storage table. If it is determined that "TX_Power" is stored (i.e., the storage table is in the state shown in FIG. 8, for example), the process proceeds to S940.

In S940, frame processing portion 220 obtains the value of transmit power based on the expression "(TX_Power−RSSI)+lower_th+margin". Here, RSSI (Receive Signal Strength Indicator) corresponds to the received field strength of the highest ratio received by STA 103, which can be obtained from the communication quality information shown in the frame received from STA 103. In the communication quality information received in the format shown in FIG. 48, if the ratio of the received field strength of RPI6 is the greatest, frame processing portion 220 of STA 102 calculates by setting RSSI to "−60", for example, by referring to the table shown in FIG. 49. The value of the transmit power obtained using the storage table shown in FIG. 8 becomes "10". If the value of the transmit power obtained based on the expression "(TX_Power−RSSI)+lower_th+margin" exceeds upper_th, however, frame processing portion 220 sets the value of the transmit power to a value not greater than upper_th.

Figure 10:
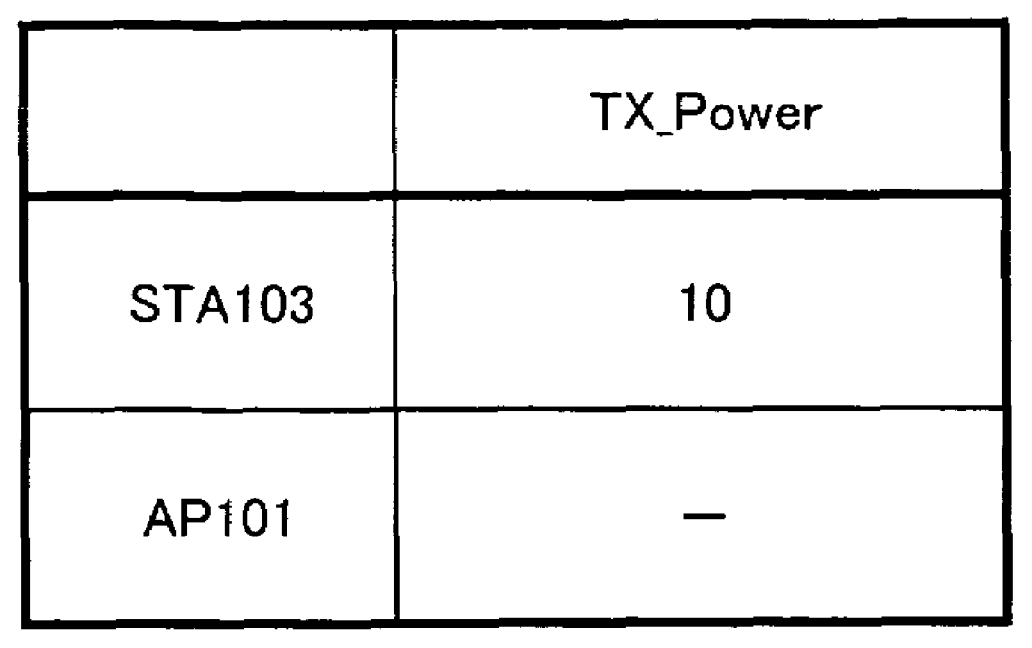

In S945, frame processing portion 220 carries out processing of updating the value of the transmit power (TX_Power="20") having been stored in the storage table to the value of the transmit power set in S940. FIG. 10 shows an example of the storage table having transmit power information stored therein. When frame processing portion 220 sets the transmit power to "10" in S940 as described above, the storage table is changed from the state shown in FIG. 8 to the state shown in FIG. 10. The flowchart is then terminated.

On the other hand, if frame processing portion 220 determines in S930 that the transmit power information "TX_Power" is not stored in the storage table (i.e., the storage table is in the state of FIG. 7, for example), the process proceeds to S935. In S935, frame processing portion 220 sets the transmit power of the frames to be transmitted to prescribed transmit power. In the first embodiment, it sets the transmit power to upper_th. In S945, frame processing portion 220 performs the processing of adding the value of the transmit power (transmit power information) set in S935 to the storage table (i.e., the storage table becomes the state shown in FIG. 8, for example). The flowchart is then terminated.

First Modification of First Embodiment

A first modification of the first embodiment will now be described. In the following, differences of the first modification of the first embodiment from the first embodiment will primarily be explained. Explanation was made in the first embodiment about the case where frame processing portion 220 controls transmit power of frames when receiving communication quality information from STA 103 and stores the controlled transmit power as transmit power information in the storage table. In the first modification of the first embodiment, explanation will be made about the case where the time when control of transmit power was carried out (hereinafter, also referred to as "transmit power control time") is stored in a storage table, and when measurement information including a measurement result of communication quality and information of the time when the measurement was started is received from STA 103, frame processing portion 220 controls the transmit power of the frames only if the time when the measurement of the communication quality was started (hereinafter, also referred to as "communication quality measurement start time") is later than the transmit power control time.

Hereinafter, the first modification of the first embodiment will be explained with reference to FIGS. 5, 11-14 and 48. In storage portion 515 of FIG. 5, a storage table for storing transmit power information and transmit power control time is configured. Otherwise, the configuration is as described above, and thus, detailed description will not be repeated.

Figure 11:
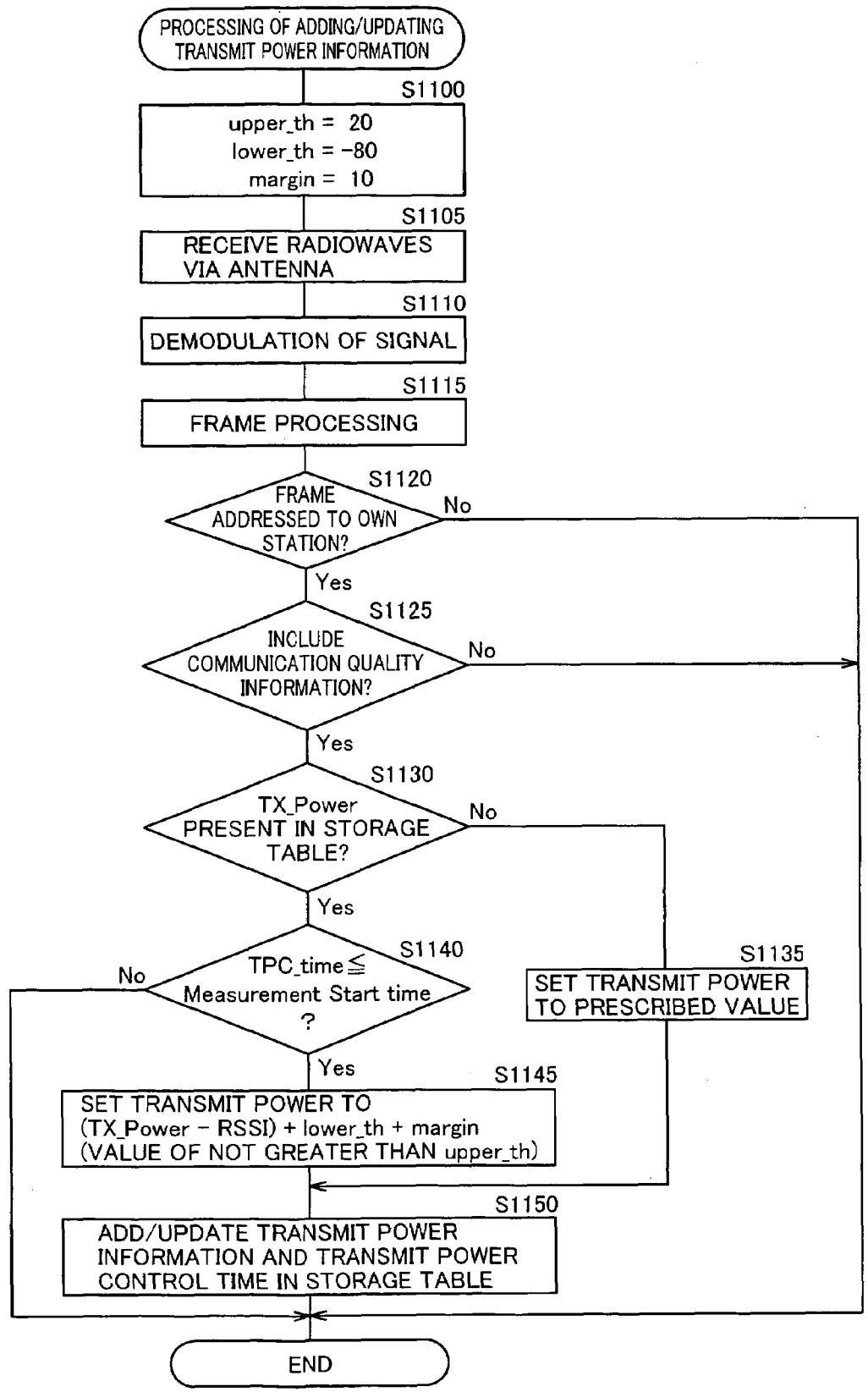
FIG. 11 is a flowchart illustrating processing of adding transmit power information and transmit power control time of transmit power controlled based on communication quality information, communication quality measurement start time, transmit power information and transmit power control time to the storage table, or updating the storage table to reflect the same, which is executed by the STA.

FIG. 11 is a flowchart illustrating processing of adding transmit power information and transmit power control time of the transmit power controlled based on communication quality information, communication quality measurement start time, transmit power information and transmit power control time to the storage table, or updating the storage table to reflect the same, which is executed by STA 102. The processes in S1100 to S1130 are identical to those in S900 to S930 of the first embodiment shown in FIG. 9, and thus, detailed description thereof will not be repeated. In the first modification of the first embodiment, STA 103 transmits a frame indicating communication quality information to STA 102, as in the first embodiment. Thus, frame processing portion 220 of STA 102 determines Yes in S1120 and Yes in S1125. The process then proceeds to S1130.

Here, reference is made to FIGS. 12 and 13. FIG. 12 shows an initial state of the storage table that can store transmit power information and transmit power control time. As shown in FIG. 12, the storage table is configured to allow management of transmit power information (TX_Power) and transmit power control time (TPC_time) for each radio communication device. FIG. 13 shows an example of the storage table having the transmit power information and the transmit power control time stored therein. FIG. 13 shows the storage table storing "20" as the transmit power information for STA 103 and "10000" as the transmit power control time. For the value stored as "TPC_time", the value of the time information (TSF (Timing Synchronization Function) Timer) synchronized in all the STAs in BSS 110, for example, may be employed.

Referring again to FIG. 11, in S1130, frame processing portion 220 determines whether transmit power information "TX_Power" is stored in the storage table. When it is determined that "TX_Power" is stored (i.e., the storage table is in the state shown in FIG. 13, for example), the process proceeds to S1140.

In S1140, frame processing portion 220 compares TPC_time in the storage table with the value of Measurement Start Time 4003 representing the measurement start time of communication quality in the received frame including communication quality information. When the value of Measurement Start Time 4003 is "11000", for example, frame processing portion 220 determines Yes for the conditional expression of TPC_time≦Measurement Start Time, and proceeds to S1145.

In S1145, frame processing portion 220 obtains a value of transmit power based on the expression "(TX_Power−RSSI)+lower_th+margin". When the ratio of the received field strength of RPI6 is the greatest in the communication quality information received in the format shown in FIG. 48, frame processing portion 220 of STA 102 refers to the table of FIG. 49, and calculates with RSSI set to "−60", for example. The transmit power becomes "10" when it is obtained using the storage table shown in FIG. 13. If the value of the transmit power obtained based on the expression "(TX_Power−RSSI)+lower_th+margin" exceeds upper_th, however, frame processing portion 220 sets the value of the transmit power to a value not greater than upper_th.

In S1150, frame processing portion 220 carries out processing of updating the value of the transmit power information (TX_Power="20") already stored in the storage table to the value of the transmit power set in S1145, and when the current time is "12000", for example, it updates the value of the transmit power control time (TPC_time="10000") to "12000". FIG. 14 shows an example of the storage table having the transmit power information and the transmit power control time stored therein. When frame processing portion 220 sets the transmit power to "10" in S1145 as described above and the time of that operation is "12000", then the storage table is changed from the state shown in FIG. 13 to the state shown in FIG. 14. Thereafter, the flowchart is terminated.

On the other hand, in S1140, when the value of Measurement Start Time 4003 is "9000", for example, frame processing portion 220 determines No for the conditional expression of TPC_time≦Measurement Start Time, and terminates this flowchart without conducting the processing of adding or updating the transmit power information in the storage table.

In S1130, if frame processing portion 220 determines that the transmit power information "TX_Power" is not stored in the storage table (i.e., the storage table is in the state of FIG. 12, for example), the process proceeds to S1135. In S1135, frame processing portion 220 sets the transmit power of the frames to be transmitted to prescribed transmit power. In the first modification of the first embodiment, the transmit power is set to upper_th as the prescribed value. In S1150, frame processing portion 220 adds the value of the transmit power (transmit power information) set in S1135 to the storage table, and when the current time is "10000", for example, it adds "10000" to transmit power control time TPC_time (i.e., the storage table becomes the state shown in FIG. 13, for example). Thereafter, the flowchart is terminated.

Second Modification of First Embodiment

A second modification of the first embodiment will now be described. In the following, differences of the second modification of the first embodiment from the first embodiment and the first modification of the first embodiment will primarily be explained. Explanation was made in the first embodiment about the case where upon receipt of communication quality information from STA 103, frame processing portion 220 controls transmit power of frames, and stores the controlled transmit power in the storage table as transmit power information. Explanation was made in the first modification of the first embodiment about the case where transmit power control time is stored in the storage table and, upon receipt of communication quality information from STA 103, frame processing portion 220 controls transmit power of frames when communication quality measurement start time is later than the transmit power control time.

In the second modification of the first embodiment, explanation will be made about the case where upon receipt of communication quality information from STA 103, firstly, the received communication quality information is added to the storage table, and frame processing portion 220 controls transmit power of frames based on the communication quality information stored in the storage table. The second modification of the first embodiment will now be described with reference to FIGS. 5 and 15-24. In storage portion 515 in FIG. 5, a storage table for storing communication quality information is configured.

Figure 15:
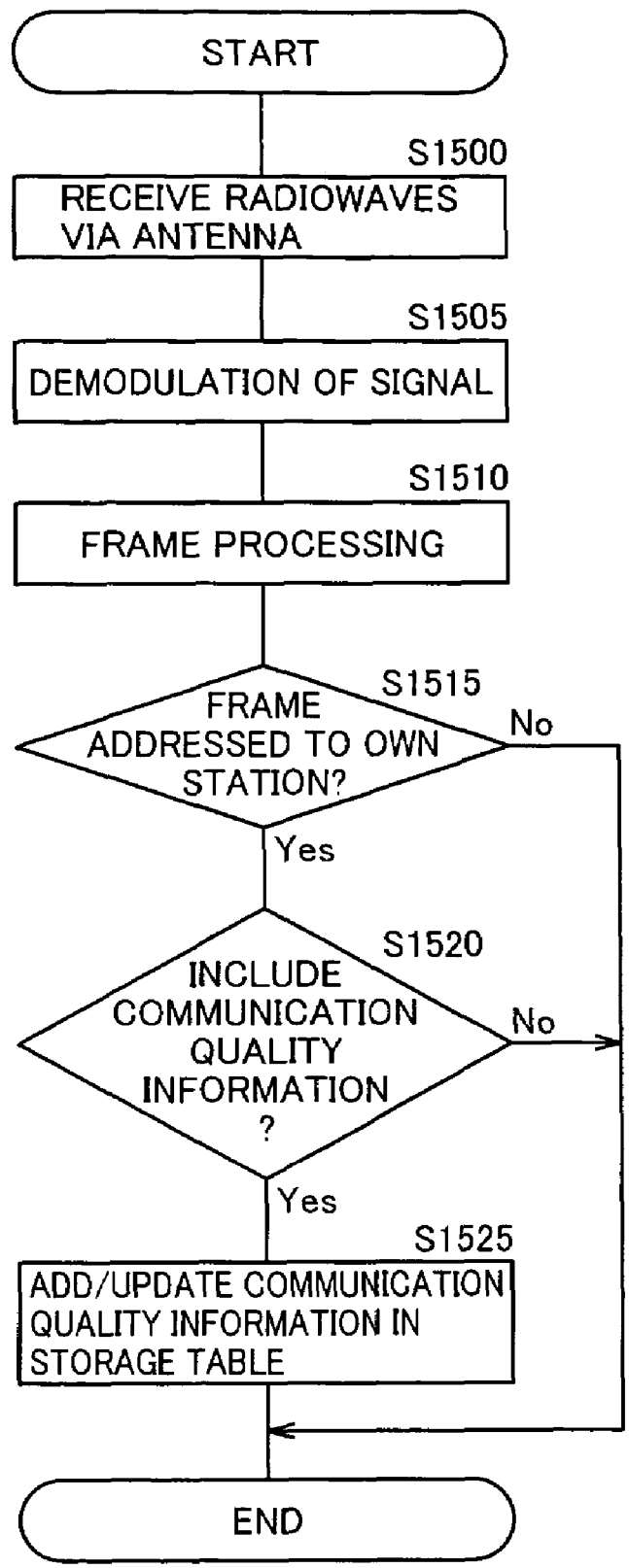
FIG. 15 is a flowchart illustrating processing of adding or updating communication quality information in a storage table, which is executed by the STA.

FIG. 15 is a flowchart illustrating processing of adding or updating communication quality information in a storage table, which is executed by STA 102. Firstly, in S1500, receiving portion 210 receives a modulated frame via antenna 205. In S1505, demodulation portion 215 demodulates the modulated frame received at receiving portion 210. In S1510, frame processing portion 220 reconstructs the frame demodulated by demodulation portion 215, and transmits the reconstructed frame to upper-level processing portion 225.

In S1515, frame processing portion 220 refers to Address 1 field 315 of the frame to determine whether the frame is addressed to STA 102. If it is determined that the frame is not addressed to STA 102, this flowchart is terminated without performing the processing of adding or updating communication quality information in the storage table. If it is determined that the frame is addressed to STA 102, the process proceeds to S1520.

In S1520, frame processing portion 220 refers to Frame_Control field 305 and Information_Element field (not shown) included in the payload data in the Frame_body field of the frame, and determines whether communication quality information is included or not. If it is determined that the communication quality information is not included, this flowchart is terminated without performing the processing of adding or updating the communication quality information in the storage table. If it is determined that the communication quality information is included, the process proceeds to S1525.

As explained in the first embodiment, STA 103 transmits the frame indicating the communication quality information to STA 102. Thus, frame processing portion 220 of STA 102 determines Yes in S1515 and Yes in S1520. The process then proceeds to S1525.

In S1525, frame processing portion 220 performs the processing of adding or updating the communication quality information in the storage table. Specifically, frame processing portion 220 performs the processing of adding the communication quality information if the storage table is in an initial state. If the communication quality information is already stored in the storage table, frame processing portion 220 performs the processing of updating it to the latest communication quality information. Thereafter, the flowchart is terminated.

FIG. 16 shows an initial state of the storage table that can store communication quality information. As shown in FIG. 16, the storage table is configured to allow management of the communication quality information (RSSI) for each radio communication device: In the first place, the storage table is in the state where communication quality information is not stored, as shown in FIG. 16. FIG. 17 shows an example of the storage table having communication quality information stored therein. FIG. 17 shows the storage table storing RSSI "–60" that is obtained from the communication quality information received from STA 103. Although the example where the RSSI value is stored in the storage table as the communication quality information has been explained, not limited thereto, the storage table may store a time density histogram of received field strength received from STA 103.

FIG. 18 shows an initial state of the storage table that can store transmit power information and communication quality information. FIG. 19 shows an example of the storage table having communication quality information stored therein. FIG. 20 shows an initial state of the storage table that can store transmit power information and communication quality information. FIG. 21 shows an example of the storage table having communication quality information stored therein. The storage table may be configured to manage the communication quality information and the transmit power information as a whole, as shown in FIGS. 18 and 19. In the case where the transmit power is uniquely determined for each stream, the storage table may be configured as shown in FIGS. 20 and 21. In the second modification of the first embodiment, it is assumed that the storage table is configured as shown in FIGS. 20 and 21.

When a frame indicating communication quality information is transmitted from STA 103 to STA 102, frame processing portion 220 of STA 102 adds the communication quality information indicated in the frame (e.g., received field strength (RSSI)) to the storage table. For example, when the ratio of the received field strength of RPI6 is the greatest, frame processing portion 220 of STA 102 adds the value of "–60", for example, to the storage table, to the cell corresponding to TSID of "15" and the column of STA 103, as shown in FIG. 21.

Hereinafter, explanation will be made, with reference to FIGS. 22-25, about the flow where STA 102 controls and sets transmit power of frames to be transmitted, and adds the set value of the transmit power (hereinafter, also referred to as "transmit power information") to the storage table or updates the storage table to reflect the same.

Firstly, referring to FIGS. 22 and 23, the flow in the case where communication quality information (RSSI) and transmit power information (TX_Power) are not stored in the storage table, and STA 102 controls and sets transmit power of frames to be transmitted and adds the set value of transmit power (transmit power information) to the storage table will be explained.

Figure 22:
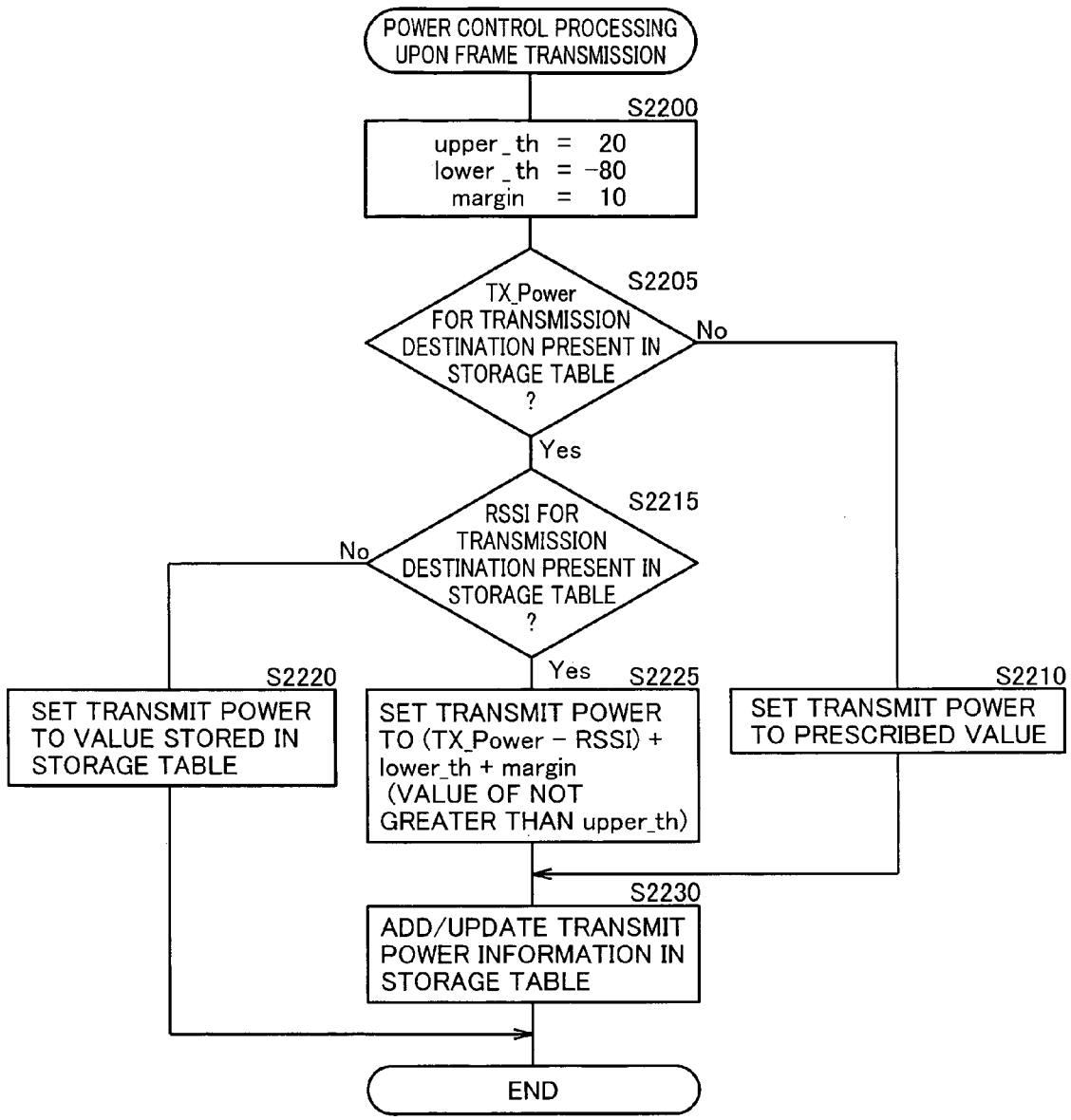
FIG. 22 is a flowchart illustrating processing of adding transmit power controlled based on communication quality information and transmit power information to the storage table as the transmit power information, or updating the storage table to reflect the same, which is executed by the STA.

FIG. 22 is, a flowchart illustrating the processing of adding the transmit power controlled based on the communication quality information and the transmit power information to the storage table as transmit power information, or updating the storage table to reflect the same, which is executed by STA 102. STA 102 receives a Poll frame transmitted from AP 101 and addressed to STA 102. When a communication permission period designated by the received Poll frame starts, STA 102 starts transmitting frames of stream data (TSID 15) to STA 103 while controlling the transmit power of the frames.

In S2200, frame processing portion 220 identified as the transmit power control portion sets an initial parameter. As the initial parameter, frame processing portion 220 sets, for example, a transmit power upper limit (upper_th), a receive power lower limit (lower_th), a margin (margin) and the like. In the second modification of the first embodiment, frame processing portion 220 sets "20", for example, as upper_th, sets "−80", for example, as lower_th, and sets "10", for example, as margin.

In S2205, frame processing portion 220 determines whether "TX_Power" for the transmission destination is stored in the storage table. If frame processing portion 220 determines that "TX_Power" is not stored, frame processing portion 220 sets transmit power of frames to be transmitted to prescribed transmit power in S2210. In the second modification of the first embodiment, frame processing portion 220 sets the transmit power to upper_th as the prescribed value. In S2230, frame processing portion 220 performs the processing of adding the value of the transmit power (transmit power information) set in S2210 to the storage table.

Here, reference is made to FIG. 23. FIG. 23 shows an example of the storage table having transmit power information stored therein. When frame processing portion 220 determines that "TX_Power" is not stored in S2205 of FIG. 22 and sets the transmit power of the frames to be transmitted to a prescribed value in S2210, frame processing portion 220 performs the processing of adding the set value of transmit power to the storage table. For example, when "20" is set as the value of transmit power, frame processing portion 220 adds the value of "20" to the cell in the storage table corresponding to TSID of "15" and the column of TX_Power, as shown in FIG. 23. Thereafter, this flowchart is terminated.

On the other hand, if it is determined in S2205 of FIG. 22 that "TX_Power" for the transmission destination is stored, the process proceeds to S2215. In S2215, frame processing portion 220 determines whether "RSSI" is stored in the storage table. When it determines that "RSSI" is not stored, it sets in S2220 the transmit power to the value of TX_Power stored in the storage table. Thereafter, the flowchart is terminated.

Hereinafter, referring to FIGS. 22 and 24, the flow in the case where values of "TX_Power" and "RSSI" are stored in the storage table, and STA 102 controls and sets transmit power of frames and updates the transmit power information already stored in the storage table to the set transmit power information will be explained.

FIG. 24 shows an example of the storage table having communication quality information and transmit power information stored therein. In the storage table shown in FIG. 24, RSSI="−60" is stored as the communication quality information and TX_Power="20" is stored as the transmit power information.

Referring to FIG. 22, if frame processing portion 220 determines in S2205 that "TX_Power" is stored in the storage table, the process proceeds to S2215. If frame processing portion 220 determines in S2215 that the value of "RSSI" is stored in the storage table, the process proceeds to S2225. In S2225, frame processing portion 220 obtains the value of transmit power based on the expression of "(TX_Power−RSSI)+lower_th+margin". The value of transmit power obtained using the storage table shown in FIG. 24 is "10". If the value of the transmit power based on the expression of "(TX_Power−RSSI)+lower_th+margin" exceeds upper_th, however, frame processing portion 220 sets the value of the transmit power of the frames to be transmitted, to a value not greater than upper_th.

In S2230, frame processing portion 220 performs the processing of updating the value of transmit power information (TX_Power="20") already stored in the storage table to the value of transmit power set in S2225. Specifically, the processing of updating the value "20" stored in the cell within the storage table corresponding to TSID of "15" and the column of TX_Power as shown in FIG. 24, to "10" is carried out. Thereafter, the flowchart is terminated.

Third Modification of First Embodiment

A third modification of the first embodiment will now be described. In the following, differences of the third modification of the first embodiment from the second modification of the first embodiment will primarily be explained. Explanation was made in the second modification of the first embodiment about the case where upon receipt of communication quality information from STA 103, the received communication quality information is added to a storage table, and frame processing portion 220 controls transmit power of frames based on the communication quality information stored in the storage table.

In the third modification of the first embodiment, firstly, the case of adding communication quality information received and the measurement start time of the communication quality to a storage table will be explained. The third modification of the first embodiment will now be explained with reference to FIGS. 5 and 25-33. In storage portion 515 of FIG. 5, a storage table for storing communication quality information and communication quality measurement start time is configured.

Figure 25:
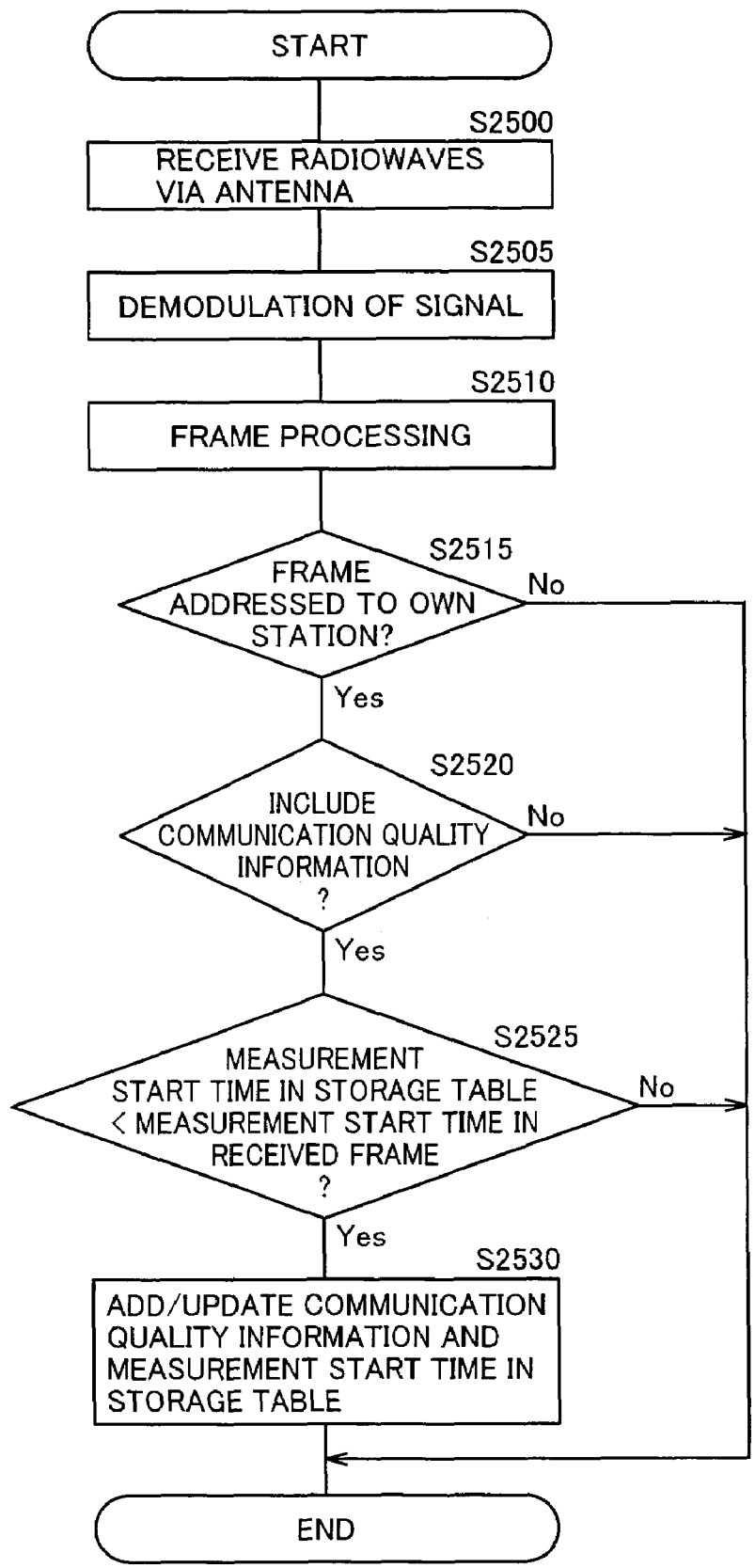
FIG. 25 is a flowchart illustrating processing of adding or updating communication quality information and communication quality measurement start time in a storage table, which is executed by the STA.

FIG. 25 shows a flowchart illustrating the processing of adding or updating communication quality information and communication quality measurement start time in a storage table, which is executed by STA 102. The processes in S2500 to S2520 are identical to those in S1500 to S1520 of FIG. 15 in the second modification of the first embodiment, and thus, detailed description thereof will not be repeated. In the third modification of the first embodiment, STA 103 transmits a frame indicating communication quality information to STA 102, as in the first embodiment. Thus, frame processing portion 220 of STA 102 determines Yes in S2515 and Yes in S2520, and the process proceeds to S2525.

Here, reference is made to FIGS. 26 and 27. FIG. 26 shows an initial state of the storage table that can store communication quality information and communication quality measurement start time. As shown in FIG. 26, the storage table is configured to allow management of communication quality information (RSSI) and communication quality measurement start time (Measurement Start Time) for each radio communication device. FIG. 27 shows an example of the storage table having communication quality information and communication quality measurement start time stored therein. FIG. 27 shows the storage table storing "−60" as the communication quality information and "10000" as the communication quality measurement start time for STA 103.

Referring again to FIG. 25, in S2525, frame processing portion 220 compares the value of Measurement Start Time stored in the storage table with the value of Measurement Start Time 4003 that is the communication quality measurement start time in the received frame. When the storage table is in the state of FIG. 26 and the value of Measurement Start Time 4003 in the received frame is "10000", frame processing portion 220 determines Yes, and proceeds to S2530.

In S2530, frame processing portion 220 performs the processing of adding or updating communication quality information and communication quality measurement start time in the storage table. When the ratio of received field strength of RPI6 is the greatest in the communication quality information received in the format shown in FIG. 48, frame processing portion 220 of STA 102 refers to the table of FIG. 49 and stores, e.g., "−60" as RSSI and stores "10000" as Measurement Start Time. The flowchart is then terminated.

When the storage table is in the state of FIG. 27 and the value of Measurement Start Time 4003 in the received frame is "9000", for example, frame processing portion 220 determines No in S2525. The flowchart is then terminated without performing the processing of adding or updating the communication quality information and the communication quality measurement start time in the storage table.

FIG. 28 shows an initial state of the storage table that can store transmit power information and transmit power control time, and communication quality information and communication quality measurement start time. FIG. 29 shows an example of the storage table having the transmit power information and the transmit power control time, and the communication quality information and the communication quality measurement start time stored therein.

Hereinafter, explanation will be made, with reference to FIGS. 28-30, about the flow where STA 102 controls and sets transmit power of frames to be transmitted to STA 103, and adds the set value of transmit power (hereinafter, also referred to as "transmit power information") to the storage table or updates the storage table to reflect the same.

Figure 30:
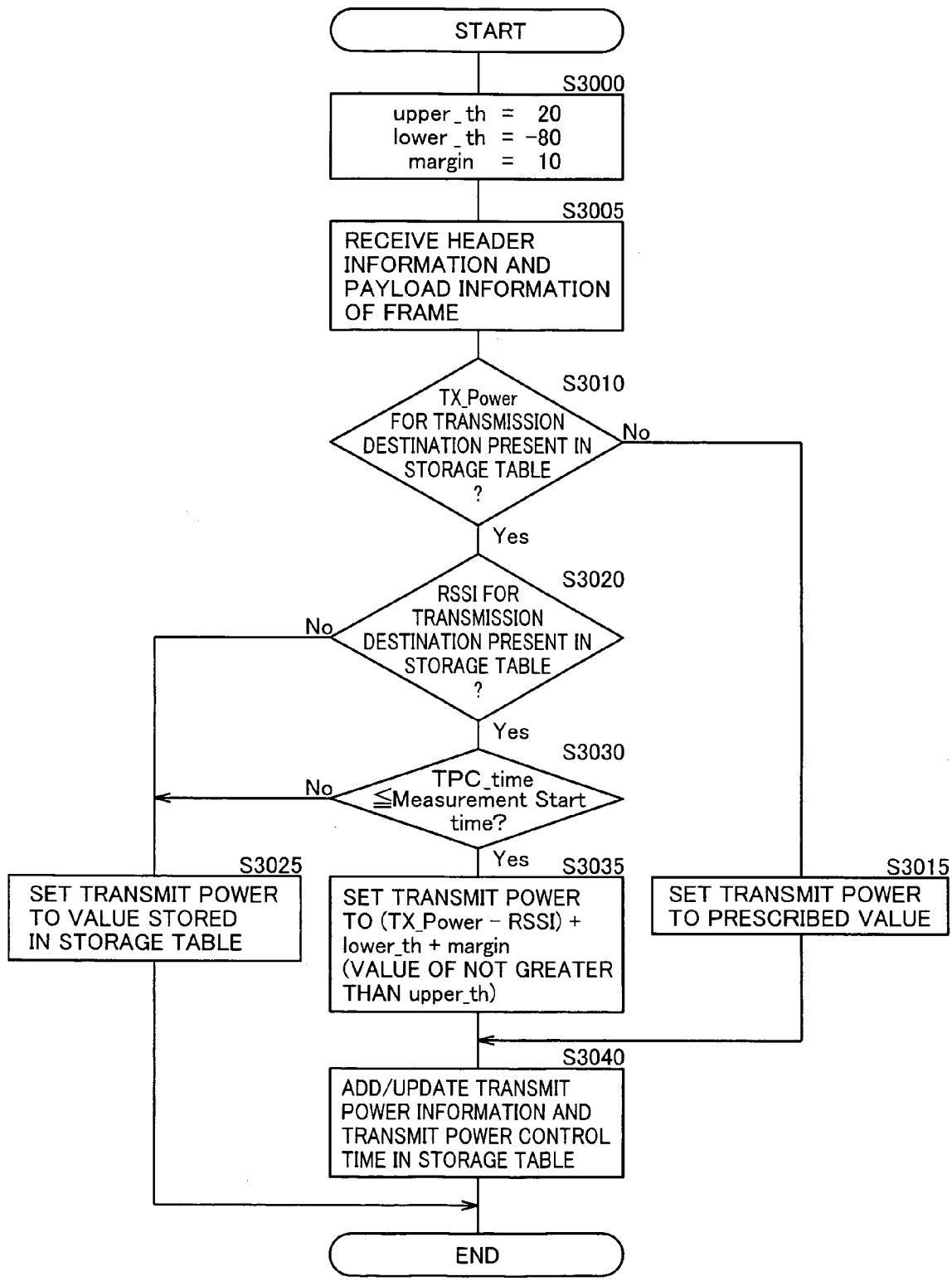
FIG. 30 is a flowchart illustrating control of transmit power of frames as well as processing of adding or updating transmit power information and transmit power control time in the storage table, which is executed by the STA.

FIG. 30 is a flowchart illustrating the processing of controlling transmit power of frames, and adding or updating transmit power information and transmit power control time in a storage table, which is executed by STA 102. Firstly, in S3000, an initial parameter is set. As the initial parameter, frame processing portion 220 sets, e.g., a transmit power upper limit (upper_th), a receive power lower limit (lower_th), and a margin (margin). In the third modification of the first embodiment, frame processing portion 220 sets "20", for example, as upper_th, sets "−80", for example, as lower_th, and sets "10", for example, as margin.

In S3005, frame processing portion 220 identified as the transmit power control portion receives header information and payload information of the frame to be transmitted, from upper-level processing portion 225.

In S3010, frame processing portion 220 refers to the storage table configured in storage portion 515, and checks whether transmit power information (TX_Power) for the radio communication device as the transmission destination is stored or not.

Here, when the storage table is in the initial state of FIG. 28, for example, frame processing portion 220 determines that transmit power information for the radio communication device as the transmission destination is not stored in the storage table, and proceeds to S3015. In S3015, frame processing portion 220 sets the transmit power of frames to a prescribed value. In the third modification of the first embodiment, the transmit power is set to upper_th as the prescribed value. In S3040, frame processing portion 220 adds the value of transmit power (transmit power information) set in S3015 to the storage table, and when the current time is "7000", for example, adds "7000" to transmit power control time TPC_time (i.e., the storage table becomes the state shown in FIG. 31, for example). FIG. 31 shows an example of the storage table having the transmit power information and transmit power control time stored therein. Thereafter, the flowchart is terminated.

On the other hand, if frame processing portion 220 determines in S3010 that "TX_Power" is stored (i.e., the storage table is in the state shown in FIGS. 29 and 31, for example), the process proceeds to S3020.

In S3020, frame processing portion 220 refers to the storage table configured in storage portion 515, and determines whether communication quality information (RSSI) for the radio communication device as the transmission destination is stored or not.

Here, if the storage table is in the state shown in FIG. 31, for example, frame processing portion 220 determines that the communication quality information for the radio communication device as the transmission destination is not stored in the storage table, and proceeds to S3025. In S3025, frame processing portion 220 sets the transmit power to "TX_Power" stored in the storage table, and the flowchart is then terminated.

On the other hand, if frame processing portion 220 determines in S3020 that "RSSI" is stored (i.e., the storage table is in the state of FIG. 29, for example), the process proceeds to S3030.

In S3030, frame processing portion 220 compares TPC_time in the storage table with the value of Measurement Start Time. If TPC_time>Measurement Start Time (i.e., the storage table is in the state of FIG. 32, for example), it determines No, and proceeds to S3025. FIG. 32 shows an example of the storage table having the transmit power information and the transmit power control time, and the communication quality information and the communication quality measurement start time stored therein. In S3025, frame processing portion 220 sets the transmit power to the value of "TX_Power" stored in the storage table. The flowchart is then terminated.

On the other hand, when frame processing portion 220 compares TPC_time in the storage table with the value of Measurement Start Time in S3030, if TPC_time≦Measurement Start Time (i.e., the storage table is in the state of FIG. 29, for example), it determines Yes, and proceeds to S3035.

In S3035, frame processing portion 220 obtains a value of transmit power based on the expression of "(TX_Power−RSSI)+lower_th+margin". The transmit power obtained when using the storage table shown in FIG. 29 is "10". If the value of transmit power obtained based on the expression of "(TX_Power−RSSI)+lower_th+margin" exceeds upper_th, however, frame processing portion 220 sets the value of transmit power to a value not greater than upper_th.

In S3040, frame processing portion 220 performs the processing of updating the value of transmit power information (TX_Power="20") already stored in the storage table to the value of transmit power set in S3035. When the current time is "12000", for example, it also updates the value of transmit power control time (TPC_time="7000") to "12000" (i.e., the storage table becomes the state of FIG. 33, for example). FIG.

33 shows an example of the storage table having the transmit power information and the transmit power control time, and the communication quality information and the communication quality measurement start time stored therein. Thereafter, the flowchart is terminated.

In the first embodiment and the first through third modifications of the first embodiment, explanation was made about the flow where when STA 103 on the receiving side receives a Poll frame addressed to STA 102, communication quality measurement portion 240 of STA 103 measures communication quality of frames received, and transmits a frame indicating communication quality information being the measurement result to STA 102. Alternatively, it may be configured such that, at the same time communication quality measurement portion 240 of STA 103 starts measurement of communication quality, a communication quality measurement portion of AP 101, which transmits the Poll frame to STA 102 for assignment of the communication right by defining a prescribed period, as well as a communication quality measurement portion of another STA (not shown) starts measurement of communication quality. In this case, AP 101 or the other STA may transmit to STA 102 a frame indicating the communication quality information being the measurement result.

Figures 34, 35:
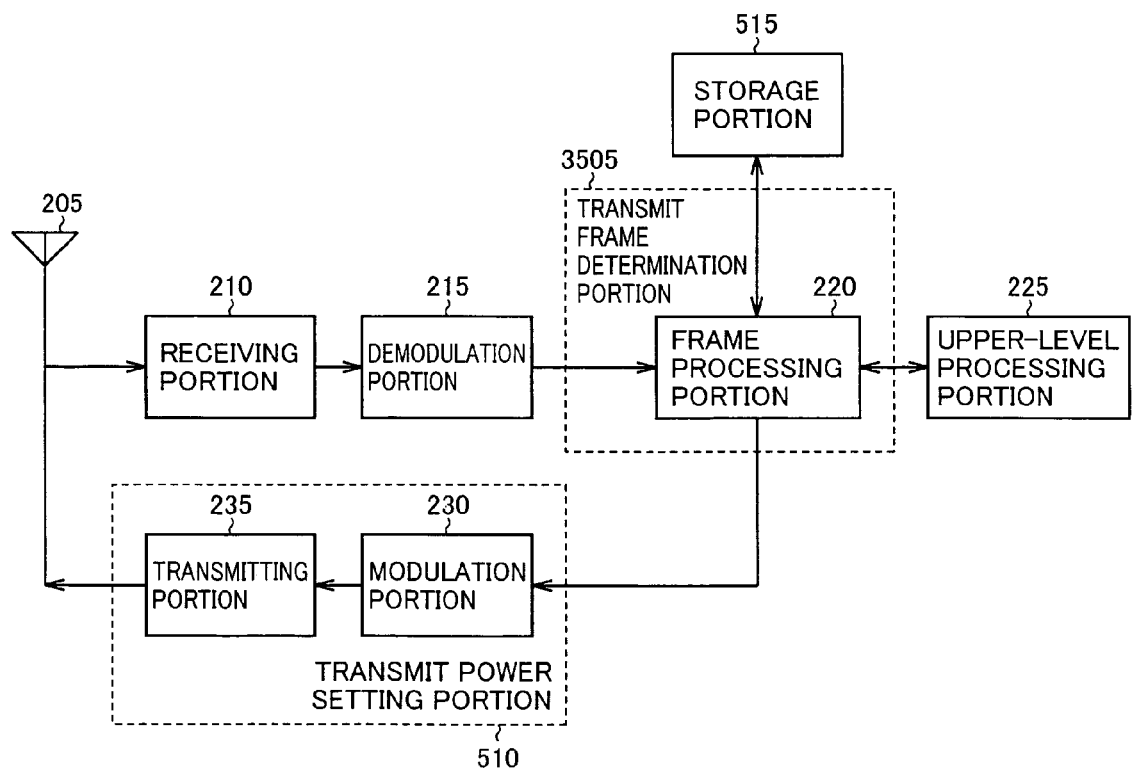
FIG. 34 shows an example of the storage table having communication quality information and transmit power information stored therein.
FIG. 35 is a functional block diagram of a STA receiving communication quality information and controlling transmit power.

Hereinafter, explanation will be made, with reference to FIG. 34, about the flow of adding communication quality information to a storage table when the communication quality is measured by the communication quality measurement portion (not shown) of AP 101. FIG. 34 shows an example of the storage table having the communication quality information and the transmit power information stored therein.

As described above, the stream data having TSID of "15" is transmitted from STA 102 to STA 103. Since the stream data is transmitted in a wireless manner (in radiowaves) from STA 102 to STA 103, AP 101 and the other STA can receive the radiowaves. As a result, the communication quality measurement portions (not shown) of AP 101 and the other STA can each measure the communication quality of radio communication of the frames transmitted and received from STA 102, as in the case of communication quality measurement portion 240 of STA 103.

For example, assume that the measurement result of communication quality measured by the communication quality measurement portion (not shown) of AP 101 is transmitted from AP 101 to STA 102. If the ratio of the received field strength of RPI5 is the greatest, frame processing portion 220 of STA 102 adds the value of "−65", for example, to the cell within the storage table corresponding to TSID of "15" and the column of AP 101, as shown in FIG. 34.

In the first embodiment described above, explanation was made about the case where in S415 and S420 in FIG. 4, frame processing portion 220 identified as the received frame analysis portion determines whether the frame is addressed to STA 103 or not and then determines whether the frame is the Poll frame or not. The configuration however is not limited thereto. For example, it may be configured such that frame processing portion 220 as the received frame analysis portion determines whether the frame is the Poll frame or not and then determines whether the frame is addressed to STA 103 or not.

Further, in S1120 and S1125 of FIG. 11 in the first modification of the first embodiment, and in S1515 and S1520 of FIG. 15 in the second modification of the first embodiment, frame processing portion 220 as the received frame analysis portion determined whether the frame is addressed to STA 102 and then determined whether the frame includes communication quality information. The configuration however is not limited thereto. For example, it may be configured such that frame processing portion 220 as the received frame analysis portion determines whether the frame includes communication quality information and then determines whether the frame is addressed to STA 102.

Still further, in the third modification of the first embodiment, in S2515, S2520 and S2525 of FIG. 25, frame processing portion 220 as the received frame analysis portion determined whether the frame is addressed to STA 102 and whether the frame includes communication quality information, and then compared the measurement start time stored in the storage table with the measurement start time included in the received frame. The configuration however is not limited thereto. For example, it may be configured such that comparison of times is followed by determination as to whether the frame includes communication quality information and then determination as to whether the frame is addressed to STA 102, or the processes may be carried out in any other order.

In the first through third modifications of the first embodiment, the example of storing "−60" in the storage table when the communication quality information shows that the ratio of the received field strength of RPI6 is the greatest, and storing "−65" when it shows that the ratio of the received field strength of RPI5 is the greatest, was shown. The configuration however is not limited thereto. For example, in the case of RPI6, the value of "−59", "−61" or the like within the corresponding range shown in FIG. 49 may be stored in the storage table, and in the case of RPI5, the value of "−64", "−66" or the like within the corresponding range may be stored in the storage table. Further, (TX_Power−RSSI) calculates the propagation loss of radiowaves over the radio channel. RSSI is not restricted to the received field strength of the highest ratio received by STA 103, as long as it is obtained from communication quality information.

Still further, in the first embodiment and the first through third modifications of the first embodiment, the case of setting upper_th=20, lower_th=−80 and margin=10 as the initial parameters for controlling the transmit power was explained. The values however are not limited thereto. Further, the respective parameters may be changed dynamically based on communication quality information and transmit power information. Still further, the respective parameters may be set for each stream or for each receiving station, depending on, e.g., the quality required for the stream to be transmitted.

According to the radio communication device as described above, only STA 102 assigned with the communication right can transmit frames during a prescribed period. Thus, communication quality measurement portion 240 of STA 103 can measure communication quality with accuracy by eliminating interference from other radio communication devices.

Further, STA 102 assigned with the communication right transmits frames, and when STA 103 or another STA and AP 101 having assigned the communication right receive the Poll frame assigning the communication right to STA 102, their communication quality measurement portions each measure the communication quality. Thus, the communication qualities with a plurality of radio communication devices can be measured without provision of any complicated mechanism in the radio communication device. In addition, the communication quality can be measured while eliminating interference from other radio communication devices, without provision of any adjustment mechanism for designating measurement start time or measurement duration of the communication quality in the radio communication device as the receiving station. As a result, the device cost can be decreased, and thus, it is possible to provide a radio communication device excellent in general versatility without modification of communication method or frame format.

Communication quality measurement portion 240 of STA 103 measures communication quality within the prescribed period during which STA 102 assigned with the communication right is transmitting frames of stream data. Thus, it can measure the communication quality without interfering other communication.

Furthermore, STA 102 stores communication quality information in a storage table only when the received frame is addressed to the own device and indicates communication quality information. This can avoid storing of unnecessary communication quality information. STA 102 can also store communication quality information from another radio communication device to which STA 102 is not transmitting frames. STA 102 can use the stored information to control transmit power when transmitting frames to the relevant radio communication device.

Still further, STA 102 can restrict the transmit power of frames to be transmitted to the minimum required level based on, e.g., the communication quality information transmitted from STA 103 and the transmit power information set as the transmit power of the frames previously transmitted, which are stored in the storage table. This can reduce consumed power.

STA 102 can avoid erroneous transmit power control in the case where the measurement start time in the frame including communication quality information received after transmit power control is earlier than the transmit power control time.

STA 102 can also avoid storing of old communication quality information in the case where the measurement start time in the received frame including communication quality information is earlier than the measurement start time of communication quality information already stored.

Furthermore, STA 102 can prevent erroneous transmit power control in the case where the measurement start time of communication quality information stored after transmit power control is earlier than the transmit power control time.

Fourth Modification of First Embodiment

A fourth modification of the first embodiment will now be described. In the following, differences of the fourth modification of the first embodiment from the first embodiment and the first through third modifications of the first embodiment will primarily be explained. In the first embodiment and the first through third modifications of the first modification, explanation was made as to how STA 102 assigned with the communication right controls transmit power when transmitting stream data to STA 103. In the fourth modification of the first embodiment, explanation will be made about the case where STA 102 transmits a broadcast frame to a plurality of radio communication devices with prescribed transmit power.

FIG. 35 is a functional block diagram of STA 102 receiving communication quality information and controlling transmit power. STA 102 has the configuration almost the same as that of STA 102 explained in the first embodiment and the first through third modifications of the first embodiment, except that frame processing portion 220 constitutes a transmit frame determination portion 3505.

Figure 36:
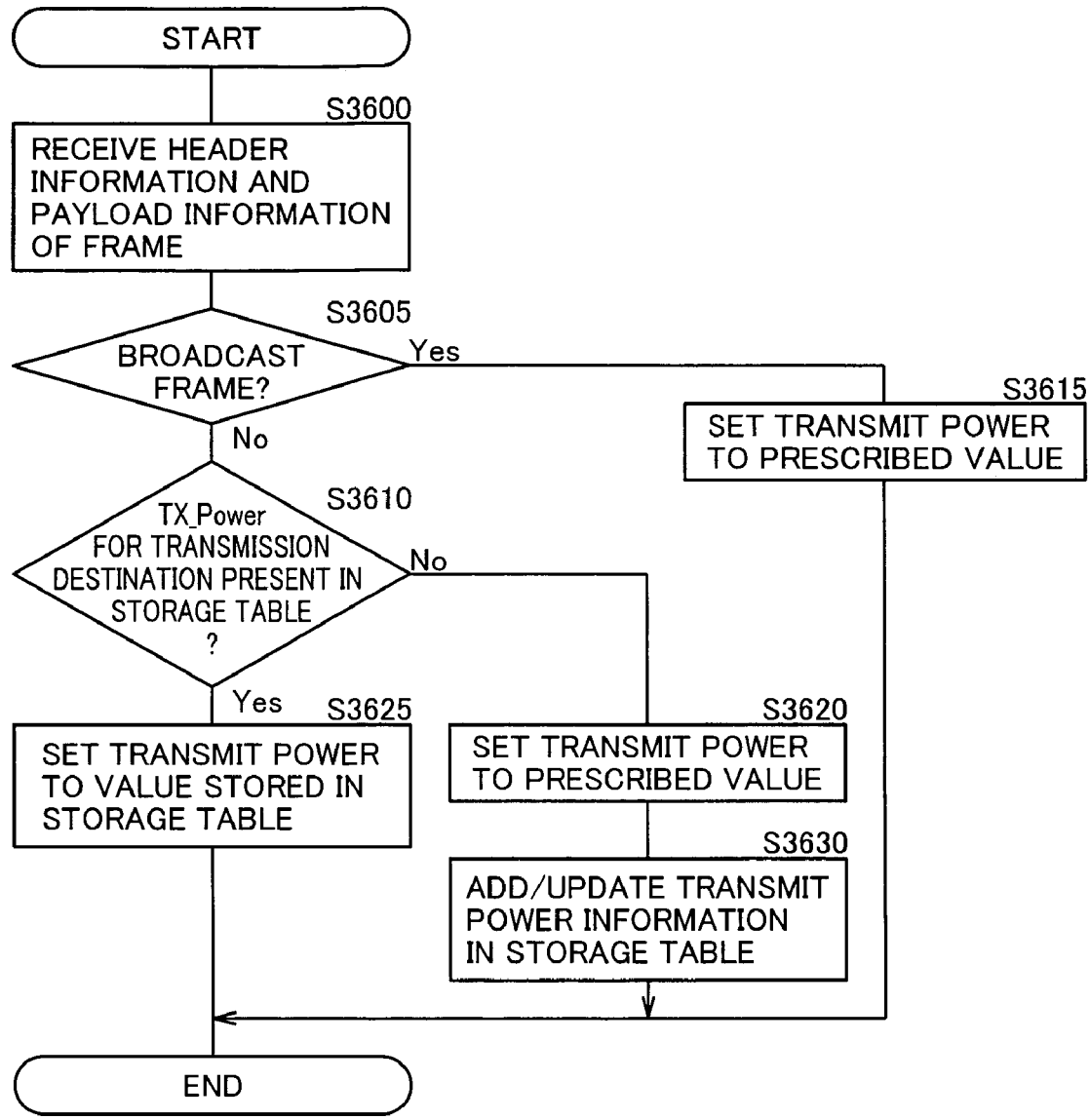
FIG. 36 is a flowchart illustrating processing of controlling transmit power that is executed by the STA when transmitting a broadcast frame.

FIG. 36 is a flowchart illustrating the processing of controlling transmit power that is executed by STA 102 when transmitting frames. Firstly, in S3600, frame processing portion 220 receives from upper-level processing portion 225 header information and payload information of the frame to be transmitted.

In S3605, frame processing portion 220 refers to the header information of the frame to be transmitted that has been received from upper-level processing portion 225, and determines whether it is a broadcast frame to be transmitted to a plurality of radio communication devices. If it is determined to be the broadcast frame, frame processing portion 220 sets transmit power of the frame to be transmitted to a prescribed value in S3615. In the fourth modification of the first embodiment, the transmit power is set to upper_th, for example, as the prescribed value. Thereafter, the flowchart is terminated.

In S3605, if it is determined that the frame is not the broadcast frame, the process proceeds to S3610. In S3610, frame processing portion 220 determines whether "TX_Power" is stored in the storage table. If it is determined that "TX_Power" is not stored, the process proceeds to S3620, where the transmit power is set to a prescribed value. In the fourth modification of the first embodiment, the transmit power is set, e.g., to upper_th as the prescribed value, and the process proceeds to S3630. In S3630, frame processing portion 220 performs the processing of adding or updating the transmit power information in the storage table. Thereafter, the flowchart is terminated.

In S3610, if frame processing portion 220 determines that "TX_Power" is stored in the storage table, it proceeds to S3625. In S3625, frame processing portion 220 sets the transmit power to the value of "TX_Power" stored in the storage table. The flowchart is then terminated.

Although the configuration of the storage table was not described in the fourth modification of the first embodiment, the storage table may have any configuration as long as it can store transmit power information as shown in the first embodiment and its modifications described above.

Second Embodiment

A second embodiment of the present invention will now be described. In the following, differences of the second embodiment from the first embodiment and the first through fourth modifications of the first embodiment will primarily be explained. In the first embodiment and its modifications, explanation was made as to how STA 102 assigned with the communication right controls transmit power when transmitting stream data to STA 103. In the second embodiment, explanation will be made, with reference to FIGS. 34, 35 and 37, about the case where STA 102 assigned with the communication right controls transmit power when transmitting the first frame of stream data to STA 103 such that not only STA 103 but also AP 101 serving as the control station can receive the frame.

Figure 37:
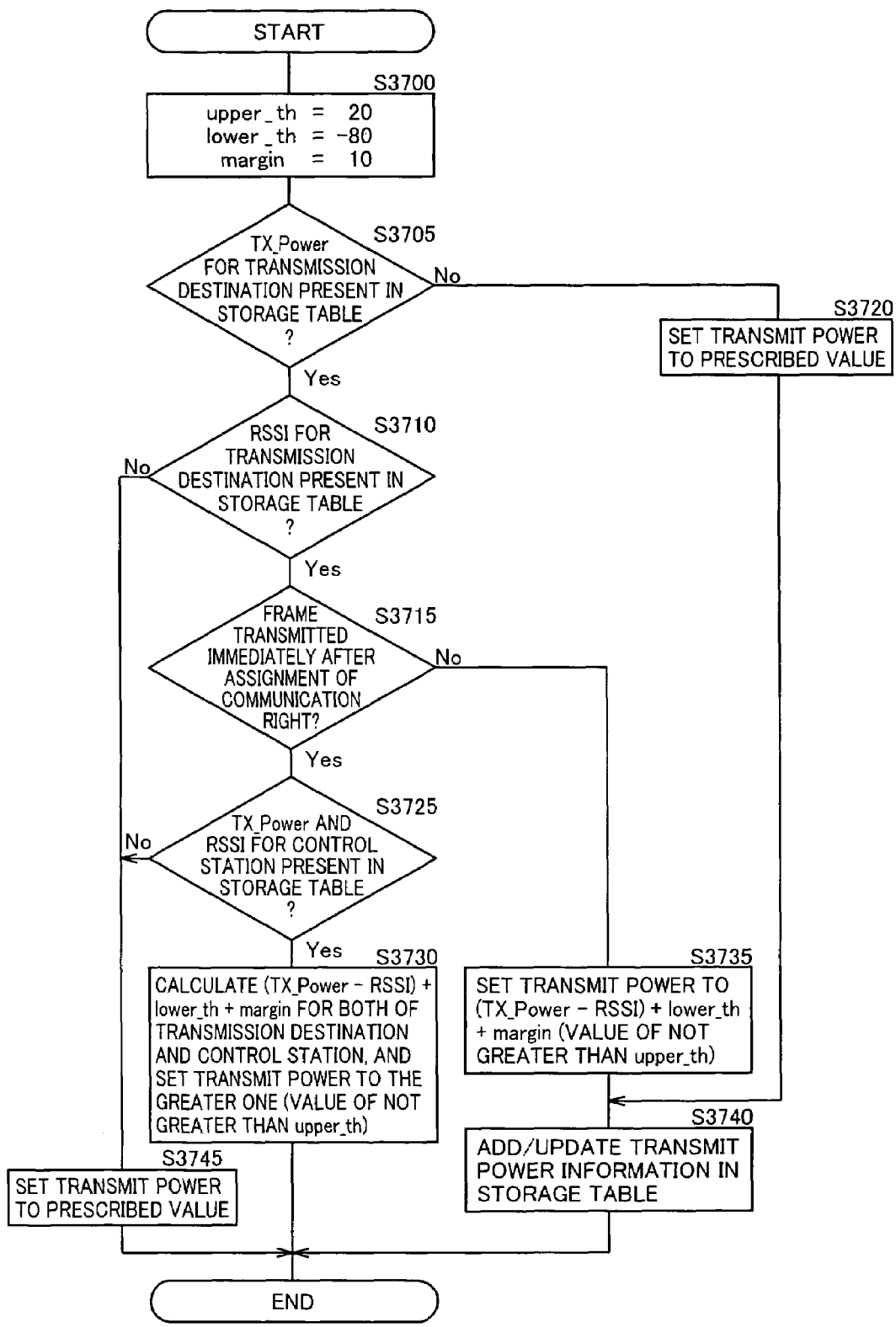
FIG. 37 is a flowchart illustrating processing of controlling transmit power of a frame to be transmitted immediately after assignment of a communication right, which is executed by the STA.

FIGS. 34 and 35 have already be explained in conjunction with the first modification of the first embodiment and others, and thus, detailed description thereof will not be repeated. FIG. 37 is a flowchart illustrating the processing of controlling transmit power of the frame to be transmitted immediately after assignment of the communication right, which is executed by STA 102. STA 102 receives a Poll frame addressed to STA 102 transmitted from AP 101, and when the communication permission period designated by the received Poll frame starts, it starts transmitting frames of stream data (TSID 15) to STA 103 while controlling the transmit power of the frames.

In S3700, frame processing portion 220 sets an initial parameter. As the initial parameter, frame processing portion 220 sets upper_th to "20", lower_th to "−80", and margin to "10", for example, as in the first embodiment and its modifications.

In S3705, frame processing portion 220 determines whether "TX_Power" for STA 103 is stored in the storage table. If it determines that "TX_Power" is not stored, it proceeds to S3720, and sets transmit power to a prescribed value. In the second embodiment, frame processing portion 220 sets the transmit power to upper_th, for example, as the prescribed value. In S3740, it adds the value set in S3720 to the storage table. Thereafter, the flowchart is terminated. If it is determined in S3705 that "TX_Power" is stored, the process proceeds to S3710.

In S3710, frame processing portion 220 determines whether "RSSI" for STA 103 is stored in the storage table. If it determines that "RSSI" is not stored, it proceeds to S3745, where it sets the transmit power to a prescribed value. The flowchart is then terminated. If it is determined in S3710 that "RSSI" is stored, the process proceeds to S3715.

In S3715, frame processing portion 220 determines whether the frame to be transmitted to STA 103 is the frame that is to be transmitted immediately after the communication right is assigned by the Poll frame. If it is determined that the frame is the frame transmitted immediately after assignment of the communication right, the process proceeds to S3725.

In S3725, frame processing portion 220 determines whether "TX_Power" and "RSSI" for AP 101 are stored in the storage table. If it determines that "TX_Power" or "RSSI" is not stored, it proceeds to S3745, where it sets the transmit power to a prescribed value. The flowchart is then terminated. If it is determined in S3725 that "TX_Power" and "RSSI" are stored, the process proceeds to S3730.

In S3730, frame processing portion 220 obtains values of transmit power for STA 103 as the destination of the frame and for AP 101 as the control station, based on the expression of "(TX_Power−RSSI)+lower_th+margin", and sets the transmit power to the greater one of the obtained values. If the obtained value exceeds upper_th, however, it sets the transmit power to a value not greater than upper_th. For example, if the storage table is in the state shown in FIG. 34, the value for STA 103 becomes "10" and the value for AP 101 becomes "15", and thus, the transmit power is set to "15". Thereafter, the flowchart is terminated.

If frame processing portion 220 determines in S3715 that the frame to be transmitted to STA 103 is not the frame to be transmitted immediately after the communication right is assigned by the Poll frame, it proceeds to S3735. The subsequent flow is identical to that of the first embodiment, and thus, detailed description thereof will not be repeated.

In the first embodiment, the first through third modifications of the first embodiment and the second embodiment, transmit power control was explained as the example of communication control employing communication quality information measured. It however is not limited thereto. For example, the communication control may be any of transmit rate control, coding rate control of stream, frame segmentation control and others. Further, the communication quality may be employed for communication control as a decoding parameter of error correction coding or a switching index of diversity antenna in the radio communication device where the communication quality was measured.

Further, in the first embodiment, the first through third modifications of the first embodiment and the second embodiment, explanation was made assuming that stream data is transmitted from STA 102 to STA 103. Therefore, FIG. 2 was explained as the configuration of STA 103 that measures communication quality and transmits the frame indicating communication quality information, and FIGS. 5 and 35 were explained as the configuration of STA 102 that receives the communication quality information and controls the transmit power. The configuration however is not limited thereto. For example, STA 102 and STA 103 may each be the radio communication device serving as the transmitting station or the radio communication device serving as the control station. Thus, STA 102 and STA 103 may each have the configuration combining the configurations shown in FIG. 2 and FIGS. 5 and 35.

Furthermore, in the first embodiment, the first through third modifications of the first embodiment and the second embodiment, explanation was made about the case where one stream (TSID 15) is transmitted when STA 102 receives one Poll frame assigning the communication right thereto. The configuration however is not restricted thereto. For example, it may be configured such that a plurality of streams (e.g., TSID 15 and TSID 14) are transmitted when STA 102 receives one Poll frame assigning the communication right thereto. In this case, it may be configured to measure communication quality for each TSID and transmit the communication quality information thus obtained.

In the first embodiment, the first through third modifications of the first embodiment and the second embodiment, the Poll frame (QoS-CF-Poll frame) was shown as the frame assigning the communication right permitting transmission of frames by defining a prescribed period. It however is not restricted thereto. For example, any frame may be used as long as it can permit transmission of frames for a predetermined period.

Further, in the first embodiment and the first through third modifications of the first embodiment, explanation was made about the case where the communication quality information transmitted from STA 103 to STA 102 is the time density histogram information of received field strength of eight levels as shown in FIGS. 48 and 49, for example. It however is not restricted thereto. For example, the communication quality information transmitted from STA 103 to STA 102 may be a measurement result of error rate, or may be a measurement result of any of EVM (Error Vector Magnitude), SNR (Signal Noise Ratio), and the number of times of continuous reception of error frames (or the number of times of continuous success in receiving frames). In such a case, transmit power may be controlled based on the error rate, or may be controlled based on whether the EVM, SNR, or the number of times of continuous reception of error frames (or the number of times of continuous success in receiving frames) satisfies a prescribed value.

Furthermore, in the first embodiment, the first through fourth modifications of the first embodiment and the second embodiment, explanation was made about the case where the names of terminals such as "STA 103" and "AP 101" as shown in FIG. 21, for example, are used as the terminal information in the storage table configured in storage portion 515. It however is not restricted thereto. For example, addresses of the terminals or the like may be used for identification.

In the first embodiment, the first through fourth modifications of the first embodiment and the second embodiment, the storage tables as shown in FIGS. 8 and 20, for example, were shown as the storage table configured in storage portion 515. It however is not restricted thereto. For example, a storage table having any data structure suitable for the algorithm performing transmit power control of frames may be employed.

Further, in the first embodiment, the first through fourth modifications of the first embodiment and the second embodiment, the configuration of storage portion 515 was explained to be a storage table. The data structure is not restricted thereto. For example, it may be the tree structure or the list structure.

In the first embodiment, the first through third modifications of the first embodiment and the second embodiment, explanation was made about the case where frame processing portion 220 sets "upper_th", "lower_th" and "margin" as the initial parameters when controlling transmit power of frames. It however is not restricted thereto. Any parameter may be used as long as it is necessary for performing transmit power control of frames or other communication control. Further, only one or more of "upper_th", "lower_th" and "margin" may be set as the initial parameters.

In the first embodiment, the first through fourth modifications of the first embodiment and the second embodiment, the configuration of AP 101 serving as the control station was not illustrated. However, since AP 101 is a radio communication device, it may have the configuration similar to those of STA 102 and STA 103.

In the first and third modifications of the first embodiment, an inequality sign "≦" was used for comparison between transmit power control time and communication quality measurement start time. Not limited thereto, it may be "<".

Further, in the first modification of the first embodiment, an inequality sign "<" was used for comparison between communication quality measurement start time of the received communication quality information and communication quality measurement start time stored in the storage table. Not limited thereto, it may be "≦".

Still further, in the first and third modifications of the first embodiment, communication quality measurement start time was used for determination of time series. Not limited thereto, communication quality measurement end time or the like may be used as well.

According to the radio communication device of the second embodiment, when frame processing portion 220 of STA 102 on the transmitting side determines that the frame now to be transmitted to STA 103 is the frame that is to be transmitted firstly after the communication right is assigned by the Poll frame, it sets the transmit power of the relevant frame to prescribed transmit power that AP 101 can receive. This avoids the situation where AP 101 cannot receive the frame transmitted from STA 102 to STA 103 and erroneously determines that STA 102 did not transmit the frame and assigns the communication right to another STA.

Third Embodiment

A third embodiment of the present invention will now be described. In the following, differences of the third embodiment from the first embodiment and others described above will primarily be explained. In the first embodiment and others, explanation was made about the processing of measuring communication quality within the prescribed period allocated by the Poll frame, carried out in S425 in FIG. 4. In the third embodiment, explanation will be made, with reference to FIG. 38, about the case where the frame received immediately after the Poll frame is not used for such measurement of communication quality.

Figure 38:
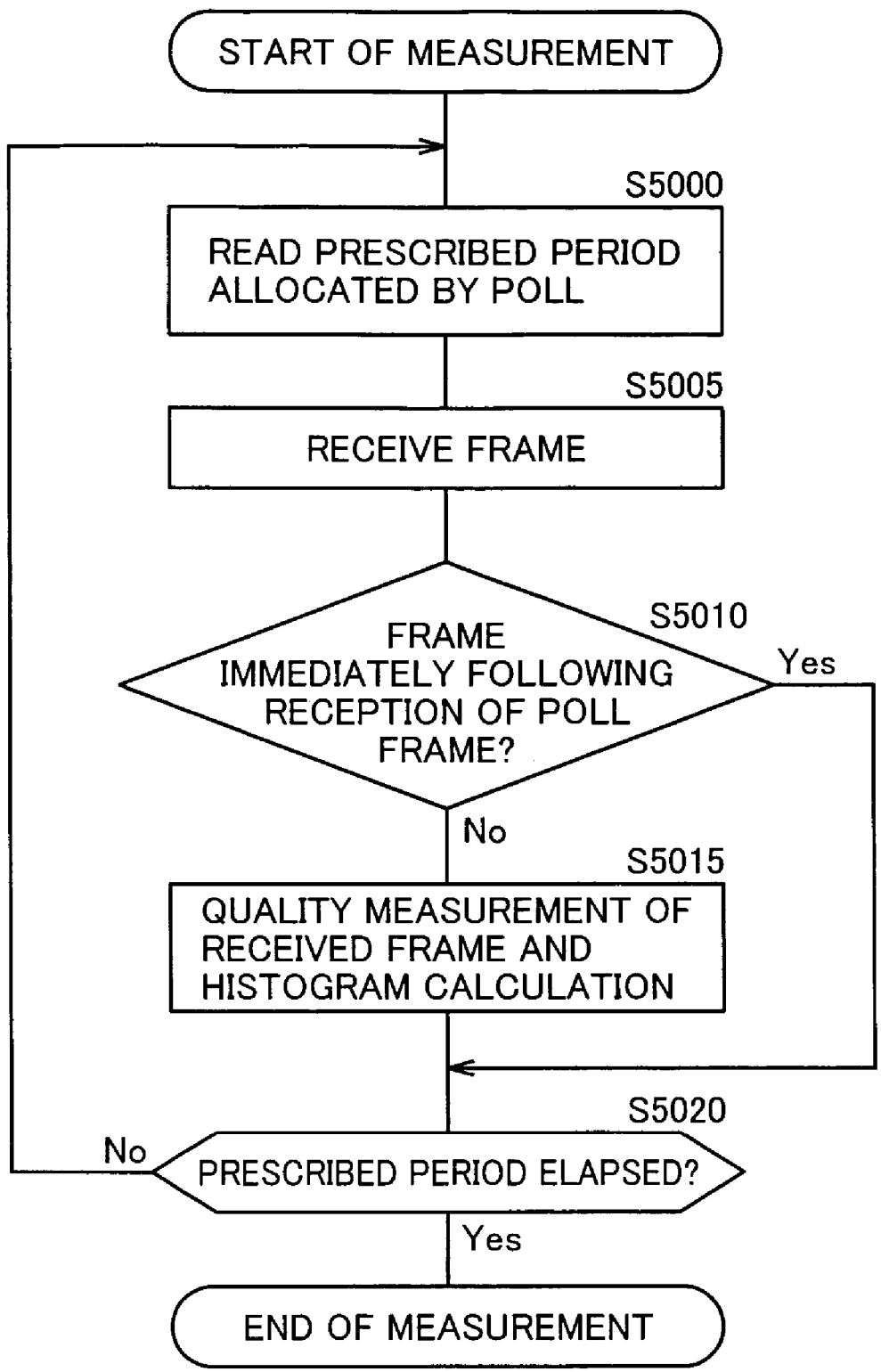
FIG. 38 is a flowchart illustrating processing of excluding the frame received immediately after the Poll frame from the measurement object of communication quality.

FIG. 38 is a flowchart illustrating the processing of eliminating the frame received immediately after the Poll frame from the measurement object of the communication quality. The processing shown in FIG. 38 corresponds to the processing of performing measurement of communication quality within a prescribed period allocated by the Poll frame in S425 in FIG. 4. That is, the processing shown in FIG. 38 is executed by STA 103.

In S5000, communication quality measurement portion 240 reads a prescribed period allocated by the Poll frame. Thereafter, the process proceeds to S5005. In S5005, receiving portion 210 receives a modulated frame, demodulation portion 215 demodulates the modulated frame received at receiving portion 210, and frame processing portion 220 reconstructs the frame demodulated by demodulation portion 215. Thereafter, the process proceeds to S5010.

In S5010, frame processing portion 220 determines whether the reconstructed frame is the frame received immediately after the Poll frame. If it is the frame received immediately following the Poll frame, the quality measurement of the received frame in S5015 is skipped, and the process proceeds to S5020.

In S5020, communication quality measurement portion 240 determines whether the prescribed period allocated by the Poll frame has elapsed after initiation of the processing of FIG. 38. If the prescribed period has not elapsed, the process returns to S5000. If the prescribed period has elapsed, the measurement is terminated.

If it is determined in S5010 that the frame is not the frame received immediately after the Poll frame, the process proceeds to S5015. In S5015, communication quality measurement portion 240 performs quality measurement of the received frame.

According to the third embodiment, even in the case as in the second embodiment where the frame to be transmitted immediately following the Poll frame is transmitted with its transmit power controlled to allow AP 101 serving as the control station to receive the same as well, the frame transmitted immediately following the Poll frame is excluded from the measurement information of the communication quality. This enables STA 102 to appropriately control the transmit power using this measurement information of the communication quality.

Fourth Embodiment

Figure 39:
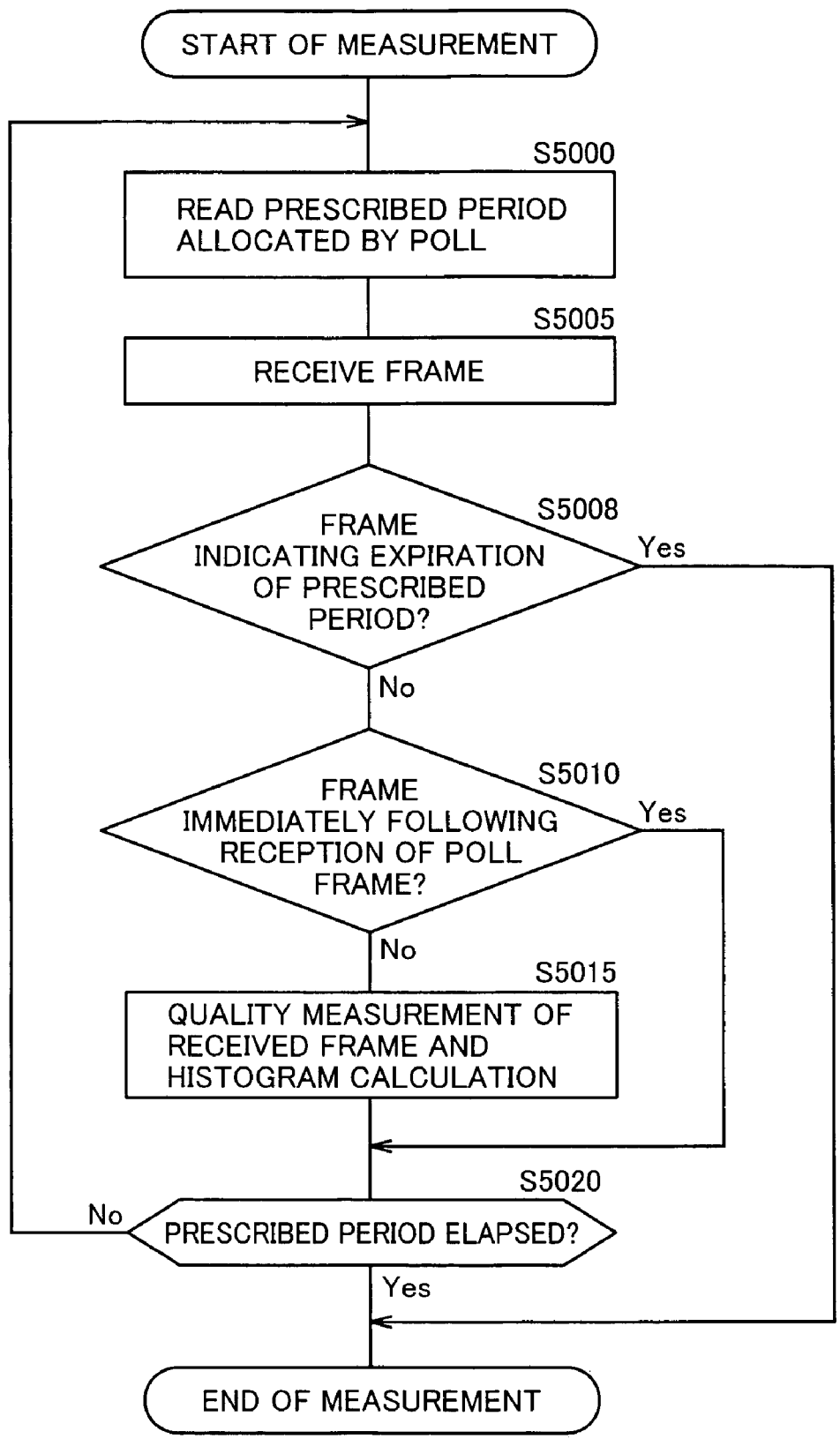
FIG. 39 is a flowchart illustrating processing of interrupting measurement of the communication quality when a frame indicating expiration of a prescribed period is received during the time when communication quality is being measured within the prescribed period assigned by the Poll frame.

A fourth embodiment of the present invention will now be described. In the fourth embodiment, explanation will be made about the processing of interrupting measurement of communication quality when a frame indicating expiration of the prescribed period is received while the communication quality measurement is carried out in the prescribed period allocated by the Poll frame. The fourth embodiment will be described with reference to FIG. 39. In FIG. 39, the same processes as those in FIG. 38 have the same step numbers allotted, and detailed description thereof will not be repeated. The processing shown in FIG. 39 is executed by STA 103. Hereinafter, the process different from that shown in FIG. 38 will be explained.

In S5008, frame processing portion 220 determines whether the reconstructed frame is the frame indicating expiration of the prescribed period. Specifically, if the Duration/ID field 310 of the received frame contains Duration information of "0", it indicates expiration of the prescribed period. If it is determined in S5008 that the frame is the one indicating expiration of the prescribed period, measurement of the communication quality is terminated.

If it is determined in S5008 that the frame is not the one indicating expiration of the prescribed period, the process proceeds to S5010, where measurement of the communication quality is continued.

According to the fourth embodiment, when STA 102 returns the communication right assigned by AP 101 as the control station, the measurement of the communication quality can be terminated by curtailing the prescribed period designated by the Poll frame. This can eliminate communication quality information unnecessary for the transmit power control.

In the fourth embodiment, the decision process in S5010 may be carried out prior to the process of S5008. Further, in the fourth embodiment, the decision process in S5010 may be omitted.

Although the case where the Duration information of Duration/ID field 310 in the received frame is "0" was explained as the case indicating expiration of the prescribed period, not limited thereto, the Duration information may have a value considerably small and close to "0".

Fifth Embodiment

A fifth embodiment of the present invention will now be described. In the following, differences of the fifth embodiment from the first embodiment and others described above will primarily be explained. In the first embodiment and others, explanation was made as to how STA 102 performs transmit power control, assuming the state of DLS (Direct Link Setting) where AP 101 as the control station, STA 102 as the transmitting station and STA 103 as the receiving station are separate devices.

In the fifth embodiment, explanation will be made, with reference to FIGS. 40-42, about the case where an AP/HC 104 serving as the control station is also the receiving station that receives frames transmitted from STA 102 serving as the transmitting station, and the infrastructure network configured with a BSS 110A is in the uplink state. That is, in BSS 110A, frames of stream data are transmitted from STA 102 to AP/HC 104.

Figure 41:
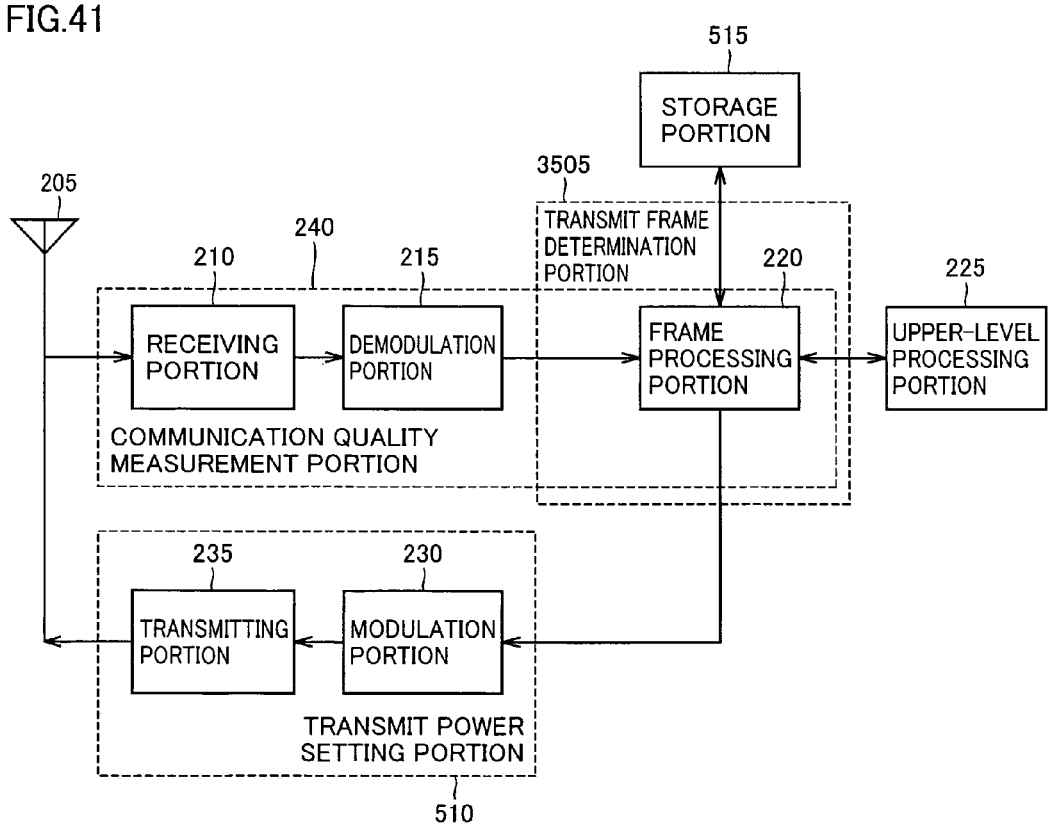
FIG. 41 is a functional block diagram of an AP/HC.

FIG. 41 is a functional block diagram of AP/HC 104. Referring to FIG. 41, AP/HC 104 has the configuration identical to that of STA 102 of FIG. 35, and thus, detailed description thereof will not be repeated. It is noted that receiving portion 210, demodulation portion 215 and frame processing portion 220 constitute communication quality measurement portion 240.

Figure 40:
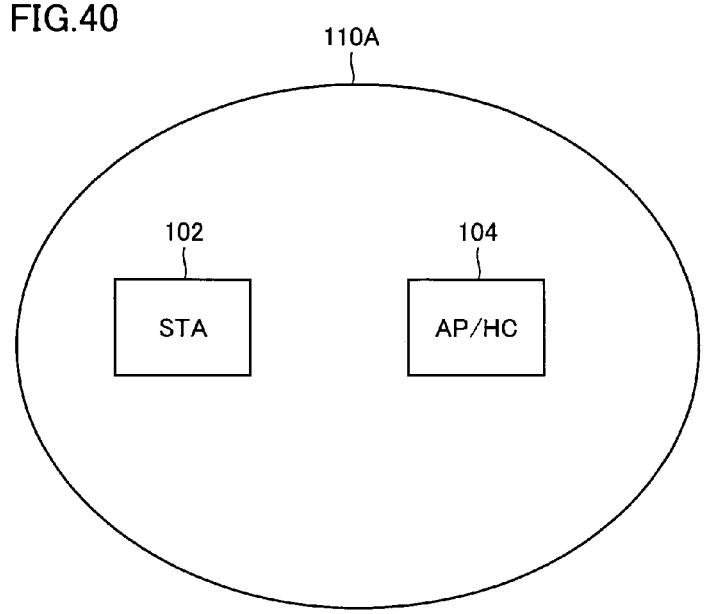
FIG. 40 is a diagram showing that the infrastructure network configured by the BSS is in the uplink state.

As shown in FIG. 40, AP/HC 104 serves as the control station, and at the same time serves as the receiving station to which the frames are transmitted from STA 102. Thus, when AP/HC 104 transmits to STA 102 the Poll frame for assigning the communication right permitting transmission of frames for a prescribed period, it performs measurement of communication quality within the prescribed period of the communication right assigned to STA 102, as in the case of the first embodiment and others described above.

Specifically, when transmit frame determination portion 3505 of AP/HC 104 determines that the frame transmitted to STA 102 is the Poll frame, communication quality measurement portion 240 performs measurement of communication quality within the prescribed period allocated by the Poll frame.

The processes following the measurement of communication quality are identical to those in the first embodiment and others described above.

Figure 42:
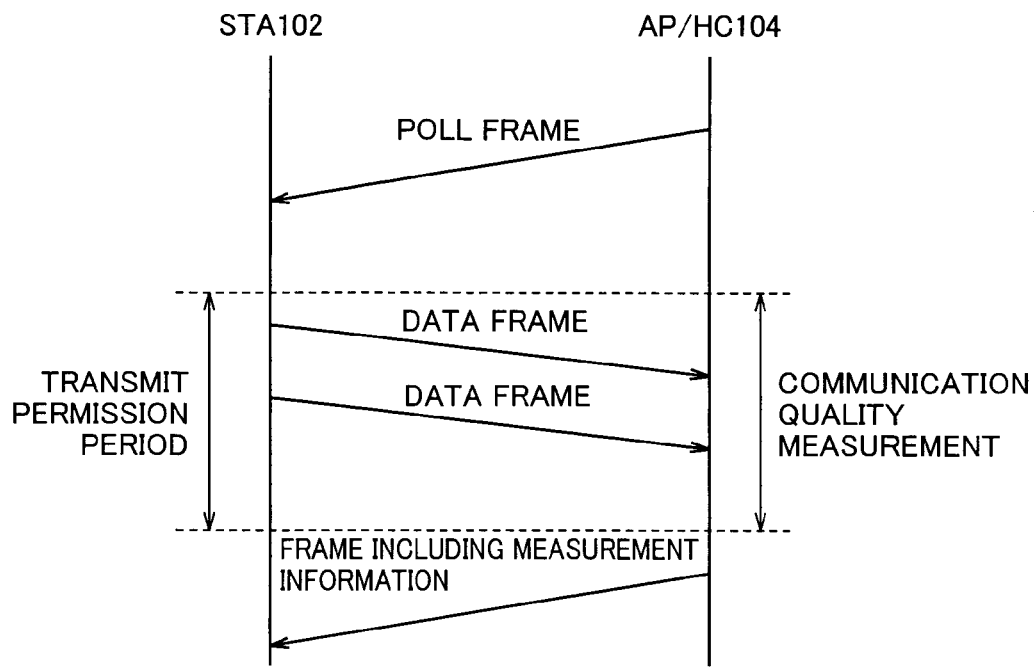
FIG. 42 shows the flow of measurement of communication quality and transmission of the measurement information in the uplink state.

FIG. 42 shows transmission/reception of frames in the uplink: Referring to FIG. 42, firstly, the Poll frame indicating assignment of the communication right is transmitted from AP/HC 104 to STA 102.

During the transmit permission period indicated by the Poll frame, AP/HC 104 measures communication quality of the frames transmitted from STA 102. The transmit permission period indicated by the Poll frame is the same as the prescribed period allocated by the Poll frame. When the transmit permission period expires, AP/HC 104 terminates measurement of the communication quality, and transmits a frame including the measurement information to STA 102.

According to the control station serving as the receiving station of the fifth embodiment, communication quality is measured within the prescribed period allocated by the Poll frame to be transmitted. Thus, it is possible to measure the communication quality by eliminating interference.

Modification of Fifth Embodiment

A modification of the fifth embodiment will now be described. In the modification of the fifth embodiment, the points different from the fifth embodiment described above will primarily be explained. In the fifth embodiment, explanation was made about the uplink state where the control station serves also as the receiving station to which frames are transmitted to STA 102.

In the modification of the fifth embodiment, explanation will be made, with reference to FIGS. 41, 43 and 44, about the case where AP/HC 104 serving as the control station also serves as the transmitting station that transmits frames to STA 103, and the infrastructure network configured with a BSS 110B is in the downlink state. That is, in BSS 110B, frames of stream data are transmitted from AP/HC 104 to STA 103.

Figure 43:
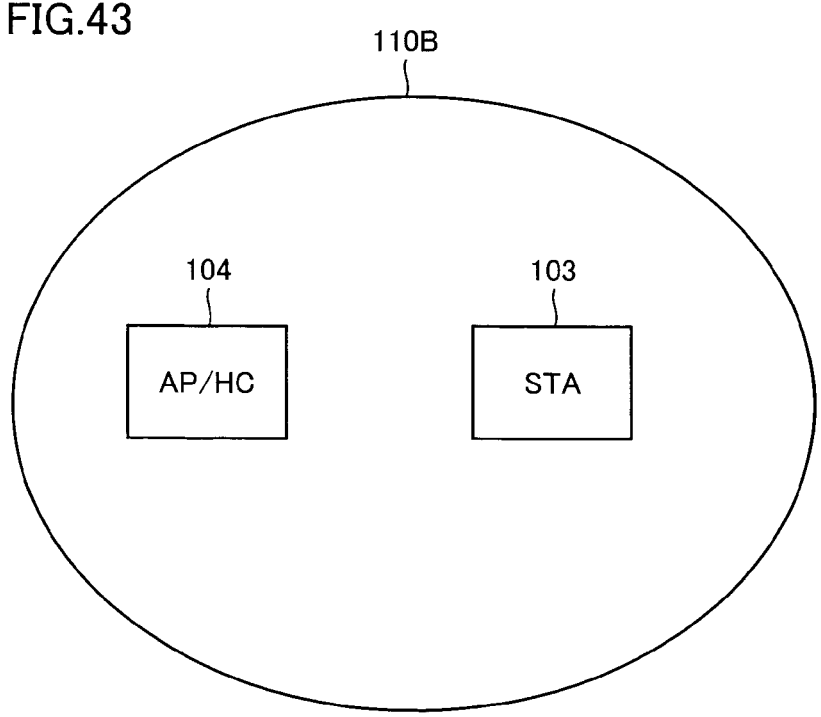
FIG. 43 is a diagram showing that the infrastructure network configured by the BSS is in the downlink state.

When AP/HC 104 serves as the control station and at the same time serves as the transmitting station transmitting frames to STA 103 as shown in FIG. 43, there is a case where AP/HC 104 starts transmission of frames to STA 103 without transmitting a Poll frame to the own station. That is, AP/HC 104 has the function of assigning to the own device the communication right permitting transmission of signals for a prescribed period.

At this time, STA 103 does not start measurement of communication quality in accordance with the Poll frame addressed to another station, but refers to Duration/ID field 310 or the like of the received frame transmitted from AP/HC 104. When the value included in the relevant field is a value sufficiently greater than the time (hereinafter, also referred to as "media busy period") when the medium (radio channel) becomes busy, which can be calculated from the length of the relevant received frame, it recognizes that the prescribed period of the communication right permitting transmission of frames has been started, and measures the communication quality. That is, STA 103 refers to Duration/ID field 310 or the like of the received frame, and when a value sufficiently greater than the media busy period is included, STA 103 performs measurement of communication quality within the period indicated by Duration/ID field 310.

More specifically, in STA 103, frame processing portion 220 shown in FIG. 2 determines whether the value of Duration/ID field 310 of the received frame is sufficiently greater than the media busy period, for example. If the value of Duration/ID field 310 is sufficiently large, frame processing portion 220 of FIG. 2 performs measurement of communication quality with the value of Duration/ID field 310 as the prescribed period.

Figure 44:
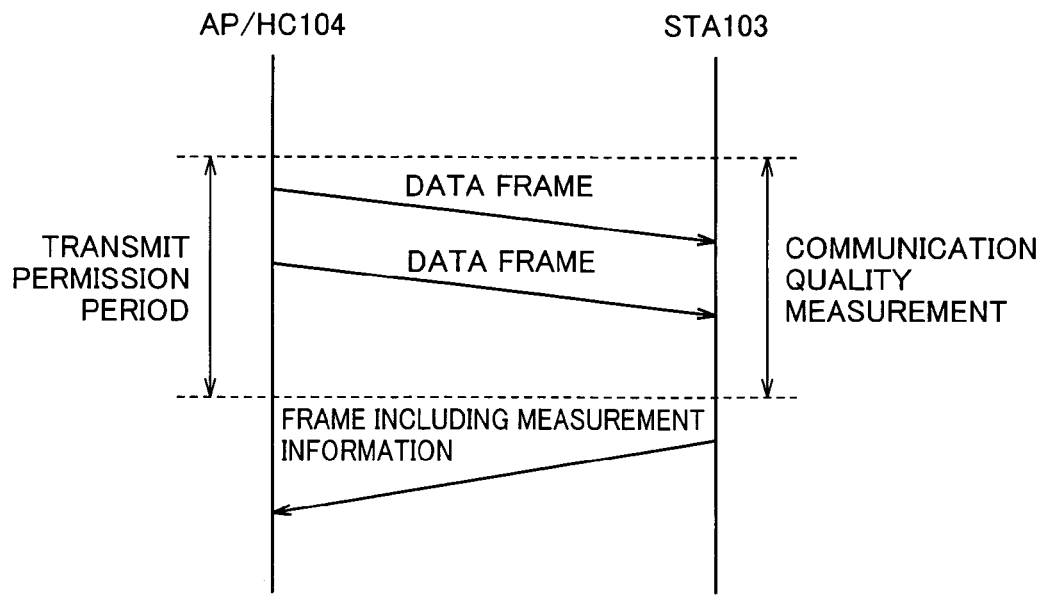
FIG. 44 shows the flow of measurement of communication quality and transmission of the measurement information in the downlink state.
Figure 45:
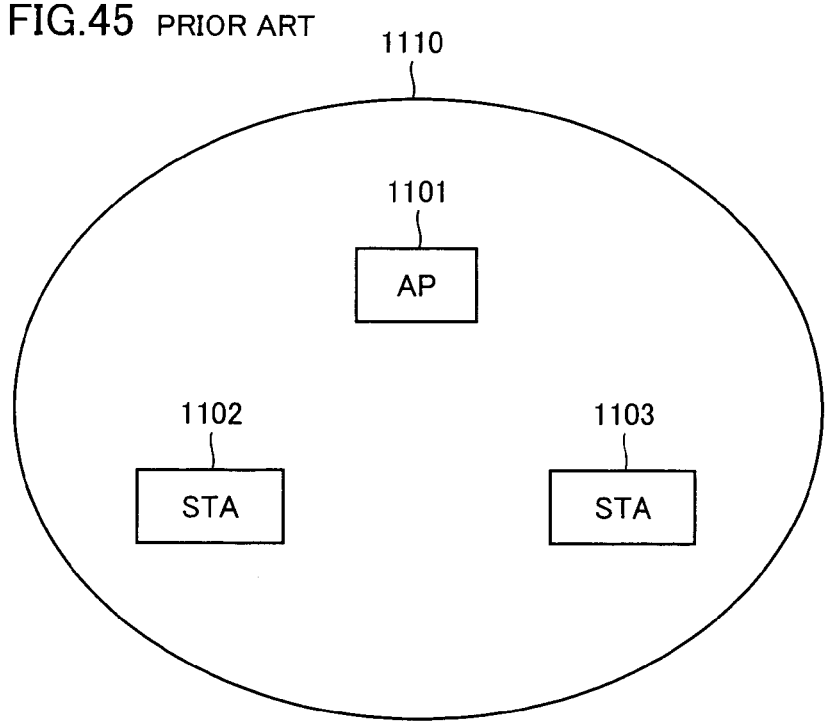
FIG. 45 schematically shows an infrastructure network configured with a single BSS.
Figure 46:
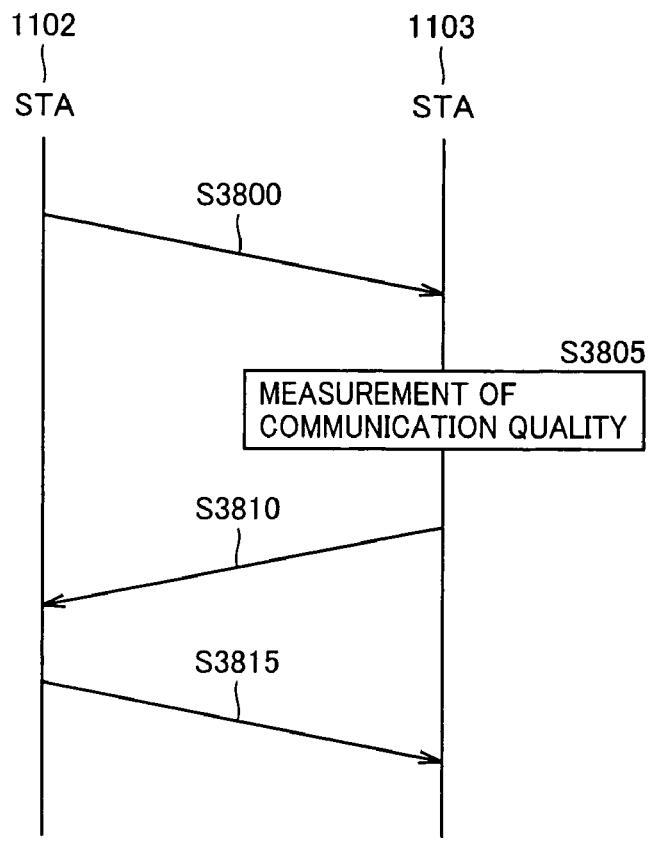
FIG. 46 shows the processing flow where the STA on the transmitting side transmits frames by controlling transmit power.
Figure 47:
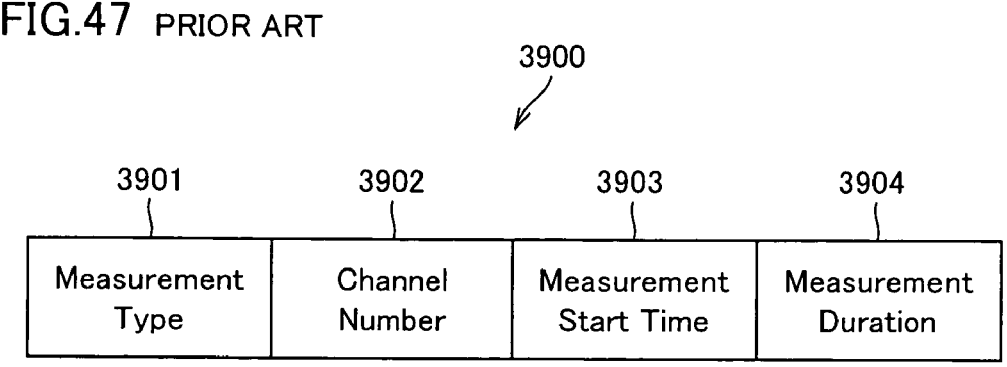
FIG. 47 shows a frame format of a part of a frame (Measurement Request Frame).

FIG. 44 shows transmission/reception of frames in the downlink. AP/HC 104 starts transmission of data frames to STA 103, without transmitting the Poll frame for assignment of the communication right. STA 103 refers to Duration/ID field 310 or the like of the received frame as described above. When STA 103 recognizes initiation of the prescribed period of the communication right permitting transmission of frames, it measures communication quality of the frames transmitted from AP/HC 104 within the prescribed period. When the prescribed period expires, it terminates measurement of the communication quality and transmits a frame including the measurement information to AP/HC 104.

The processes following the measurement of communication quality are identical to those in the first embodiment.

According to the receiving station of the modification of the fifth embodiment, even in the case where the communication right permitting transmission of frames within a prescribed period is assigned without transmission of a Poll frame, it can perform measurement of communication quality within the prescribed period.

Although the case of referring to Duration/ID field 310 of the received frame was explained in the modification of the fifth embodiment, it is not limited thereto. For example, QoS_Control field 320 in FIG. 3 may be referred to. Further, the determination may be made based on whether Frame_Control field 305 shows that the frame is a QoS data frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio communication device receiving a signal from another radio communication device transmitting a signal, when receiving a communication permission signal assigning a communication right permitting transmission of signals by defining a prescribed period from a radio communication device serving as a control station, comprising:
 a received signal analysis portion for analyzing a received signal; and
 a measurement portion for measuring communication quality; wherein
 when said received signal analysis portion determines that said received signal is addressed to the radio communication device, said measurement portion does not measure the communication quality,
 when said received signal analysis portion determines that said received signal is not said communication permission signal assigning said communication right to said other radio communication device, said measurement portion does not measure the communication quality, and
 when said received signal analysis portion determines that said received signal is said communication permission signal assigning said communication right to said other radio communication device, said measurement portion measures the communication quality with said other radio communication device within said prescribed period.

2. The radio communication device according to claim 1, further comprising a communication quality transmitting portion for transmitting a quality information signal indicating a measurement result of said communication quality measured by said measurement portion to said other radio communication device assigned with said communication right.

3. A radio communication device serving as a receiving station performing communication with a transmitting station to which a control station assigns a communication right permitting transmission of signals for a prescribed period, comprising:
 a measurement portion for measuring communication quality with said transmitting station within said prescribed period when receiving a signal assigning said communication right to said transmitting station, wherein
 when said received signal analysis portion determines that said received signal is addressed to the radio communication device, said measurement portion does not measure the communication quality, and
 when said received signal analysis portion determines that said received signal is not said communication permission signal assigning said communication right to said transmitting station, said measurement portion does not measure the communication quality.

4. The radio communication device according to claim 3, further comprising a communication quality transmitting portion for transmitting to said transmitting station measurement information including at least a measurement result of said communication quality measured by said measurement portion.

5. The radio communication device according to claim 3, further comprising a received signal determination portion for determining a received signal, wherein
 said received signal determination portion determines whether said received signal is a signal firstly transmitted after assignment of said communication right, and
 when said received signal determination portion determines that said received signal is said firstly transmitted signal, said measurement portion performs measurement of said communication quality except for said firstly transmitted signal.

6. The radio communication device according to claim 5, wherein said measurement portion terminates measurement of said communication quality when said received signal determination portion determines that said received signal is a signal indicating that said prescribed period corresponding to said communication right expires.

7. A radio communication device serving as a receiving station performing communication with a transmitting station to which a control station assigns a communication right permitting transmission of signals for a prescribed period, comprising:
 a measurement portion for measuring communication quality with said transmitting station within said prescribed period when recognizing that said communication right has been assigned to said transmitting station, wherein
 when said received signal analysis portion determines that said received signal is addressed to the radio communication device, said measurement portion does not measure the communication quality, and
 when said received signal analysis portion determines that said received signal is not said communication permission signal assigning said communication right to said transmitting station, said measurement portion does not measure the communication quality.

8. The radio communication device according to claim 7, further comprising a communication quality transmitting portion for transmitting to said transmitting station measurement information including at least a measurement result of said communication quality measured by said measurement portion.

9. The radio communication device according to claim 7, further comprising a received signal determination portion for determining a received signal, wherein
 said received signal determination portion determines whether said received signal is a signal firstly transmitted after assignment of said communication right, and
 when said received signal determination portion determines that said received signal is said firstly transmitted signal, said measurement portion performs measurement of said communication quality excluding said firstly transmitted signal.

10. The radio communication device according to claim 9, wherein said measurement portion terminates measurement of said communication quality when said received signal determination portion determines that said received signal is a signal indicating that said prescribed period corresponding to said communication right expires.

11. The radio communication device according to claim 7, wherein said radio communication device has a function of assigning said communication right permitting transmission of signals for said prescribed period to said transmitting station.

12. A radio communication system configured with a control station assigning a communication right permitting transmission of signals for a prescribed period, and a second radio communication device capable of receiving a signal transmitted from a first radio communication device assigned with said communication right, wherein said second radio communication device includes a received signal analysis portion for analyzing a received signal, and a measurement portion for measuring communication quality with said first radio communication device within said prescribed period when said received signal analysis portion determines that said received signal is a signal assigning said communication right to said first radio communication device, wherein when said received signal analysis portion determines that said received signal is addressed to the first radio communication device, said measurement portion does not measure the communication quality, and when said received signal analysis portion determines that said received signal is not said communication permission signal assigning said communication right to said first radio communication device, said measurement portion does not measure the communication quality.

13. The radio communication system according to claim 12, wherein said second radio communication device further includes a communication quality transmitting portion for transmitting to said first radio communication device a signal indicating a measurement result of said communication quality measured by said measurement portion.

14. A measurement method for causing a radio communication device serving as a receiving station to perform measurement processing, the radio communication device serving as the receiving station communicating with a transmitting station to which a control station assigns a communication right permitting transmission of signals for a prescribed period, the method comprising the steps of:

analyzing a received signal;

recognizing that said communication right has been assigned to said transmitting station; and when it is recognized that said communication right has been assigned to said transmitting station, measuring communication quality with said transmitting station within said prescribed period, when it is recognized that communication right has not been assigned to said transmitting station, measuring communication quality with said transmitting station is not performed, and when it is recognized that said received signal is addressed to said transmitting station, measuring communication quality with said transmitting station is not performed.

15. The measurement method according to claim 14, wherein said step of measuring the communication quality includes the step of measuring received field strength within said prescribed period.

* * * * *

UNITED STATES PATENT AND TRADEMARK OFFICE
CERTIFICATE OF CORRECTION

| | | |
|---|---|---|
| PATENT NO. | : 7,653,410 B2 | Page 1 of 1 |
| APPLICATION NO. | : 11/294501 | |
| DATED | : January 26, 2010 | |
| INVENTOR(S) | : Makoto Itsuki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-third Day of November, 2010

David J. Kappos
*Director of the United States Patent and Trademark Office*